(12) United States Patent
Misawa

(10) Patent No.: US 7,953,463 B2
(45) Date of Patent: *May 31, 2011

(54) PORTABLE DEVICE

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,289

(22) Filed: Mar. 26, 2010

(65) Prior Publication Data

US 2010/0177038 A1 Jul. 15, 2010

Related U.S. Application Data

(62) Division of application No. 11/865,236, filed on Oct. 1, 2007.

(30) Foreign Application Priority Data

Sep. 29, 2006 (JP) ................................. 2006-269385

(51) Int. Cl.
H04B 1/38 (2006.01)
(52) U.S. Cl. ............... 455/575.1; 455/575.3; 455/575.4; 455/347
(58) Field of Classification Search ............. 455/575.1, 455/575.3, 575.4, 566, 347

See application file for complete search history.

(56) References Cited

U.S. PATENT DOCUMENTS

| | | | |
|---|---|---|---|
| 7,076,058 B2 * | 7/2006 | Ikeuchi et al. | 379/433.12 |
| 2006/0025184 A1 * | 2/2006 | Cho et al. | 455/575.4 |
| 2006/0135228 A1 * | 6/2006 | Kato | 455/575.4 |
| 2006/0211460 A1 * | 9/2006 | Jeong et al. | 455/575.4 |

FOREIGN PATENT DOCUMENTS

| | | |
|---|---|---|
| CN | 1404281 A | 3/2003 |
| CN | 1538716 A | 10/2004 |
| JP | 2003-298699 A | 10/2003 |
| JP | 2004-320549 A | 11/2004 |
| JP | 2005-038217 A | 2/2005 |
| JP | 2005-115536 A | 4/2005 |
| JP | 2005-123930 A | 5/2005 |
| JP | 2005-286813 A | 10/2005 |
| JP | 2006-180071 A | 7/2006 |
| JP | 2007-174372 A | 7/2007 |
| WO | 2006/030607 A1 | 3/2006 |
| WO | 2006/038499 A1 | 4/2006 |

OTHER PUBLICATIONS

CN Notification of the First Office Action, dated Feb. 5, 2010, issued in corresponding CN Application No. 2007101641188, 12 pages English and Chinese.

* cited by examiner

*Primary Examiner* — Tuan A Pham
(74) *Attorney, Agent, or Firm* — Sughrue Mion, PLLC

(57) ABSTRACT

According to the portable device of an aspect of the present invention, the first enclosure and the second enclosure are brought into movable linkage between the first position where the silhouettes of the first enclosure and the second enclosure are overlapped and the second position where the second enclosure is moved in parallel from the first position. In addition, the first enclosure and the second enclosure are rotatably and movably linked between the first position and the third position where the second enclosure is rotatably moved from the first position at a predetermined angle.

9 Claims, 16 Drawing Sheets

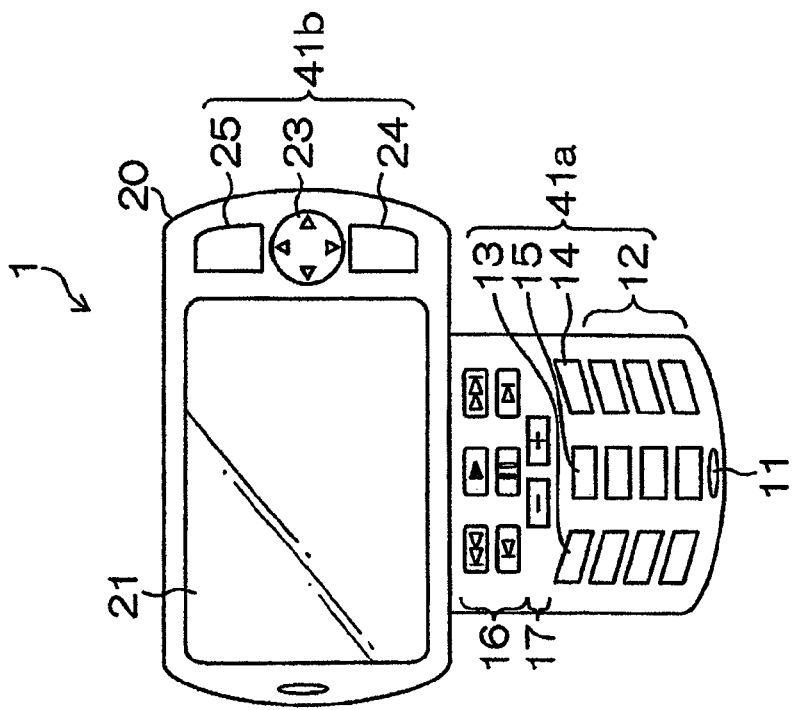
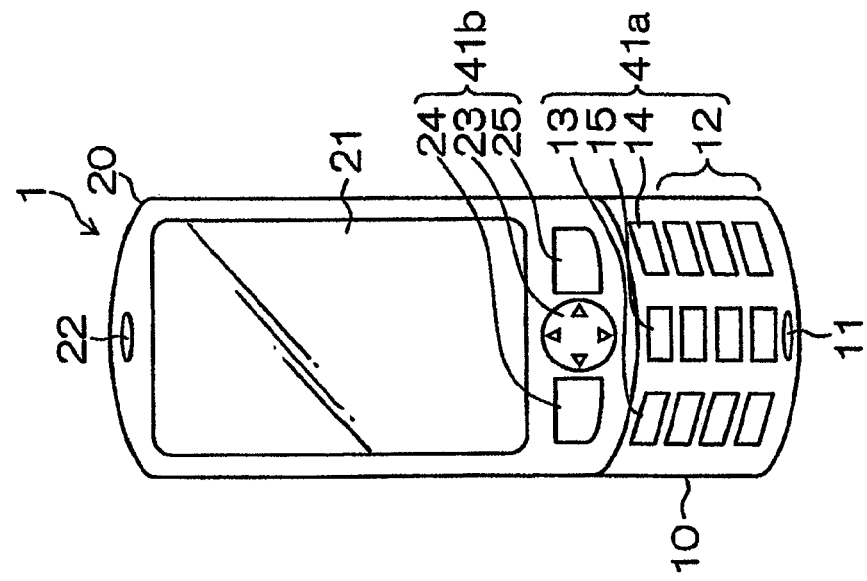
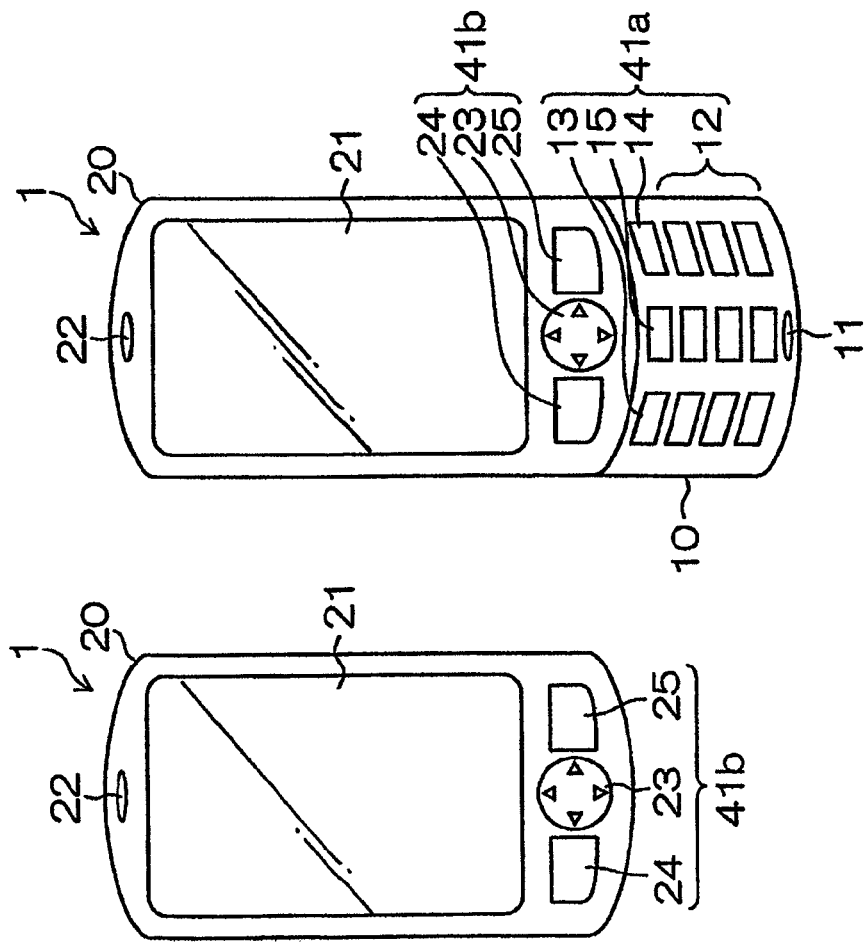

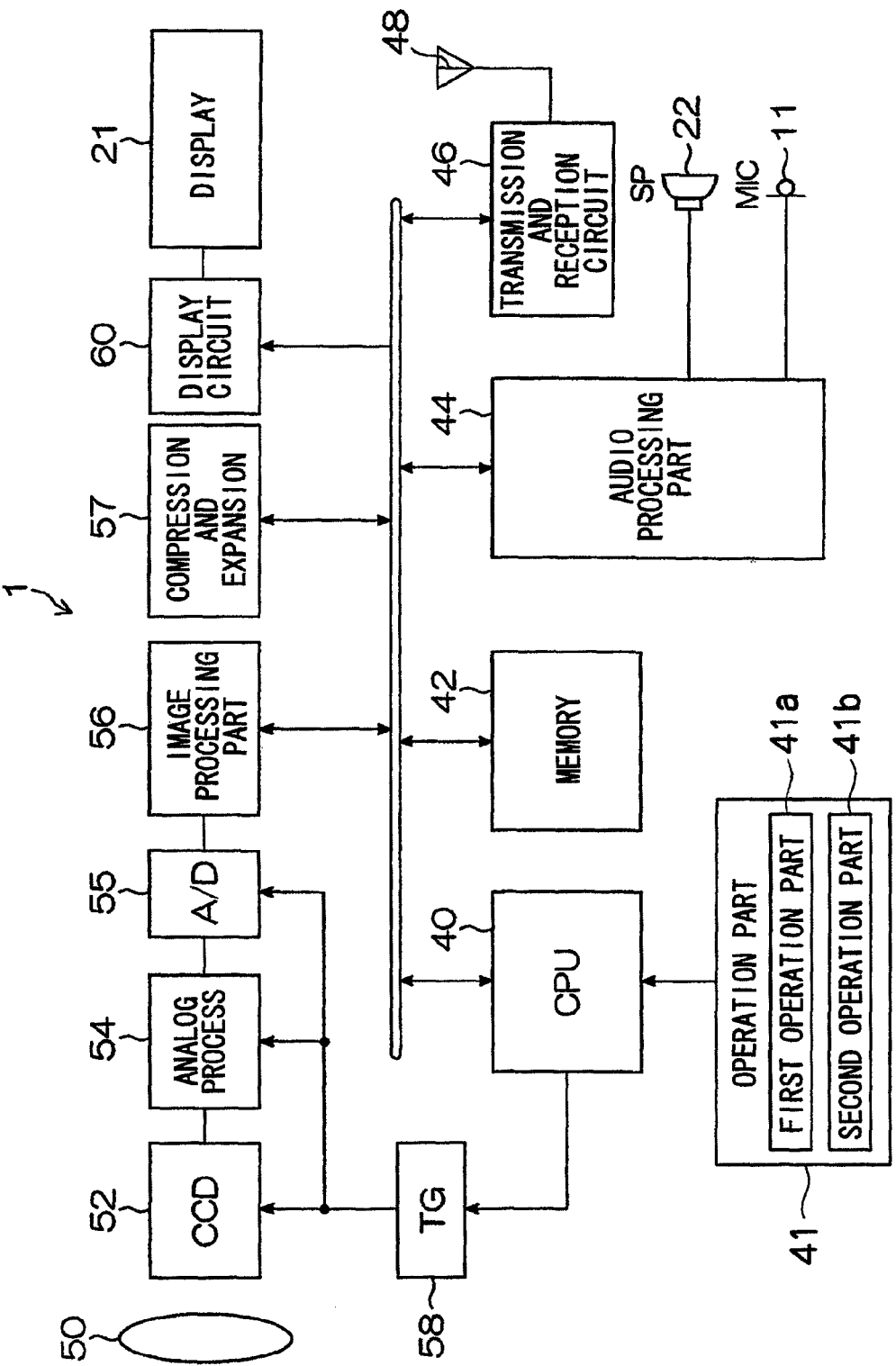

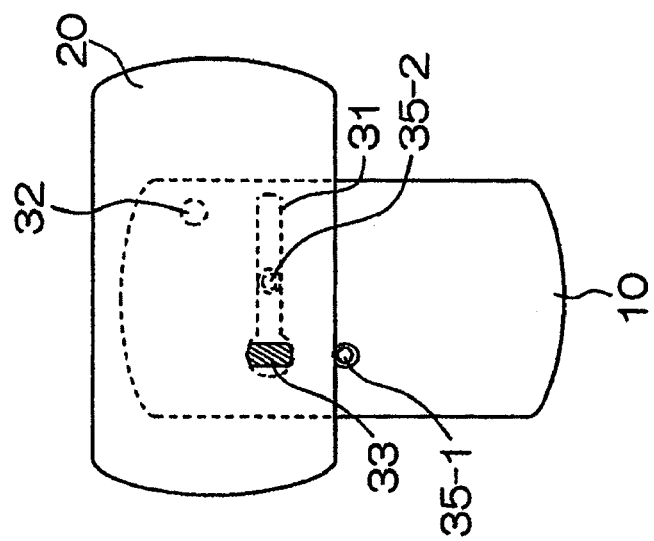
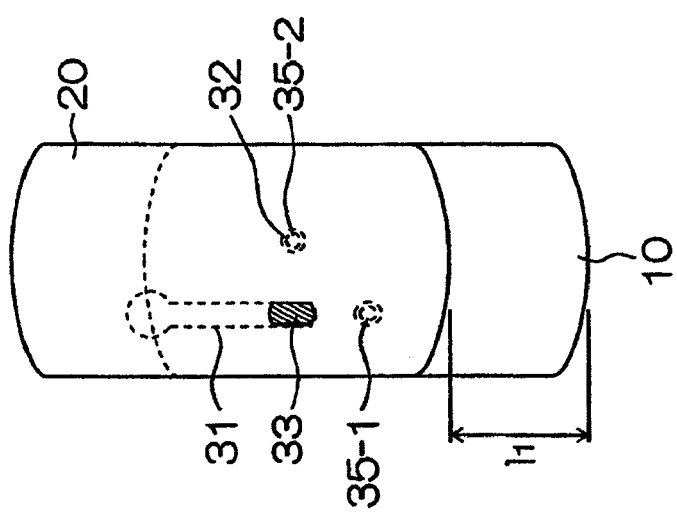
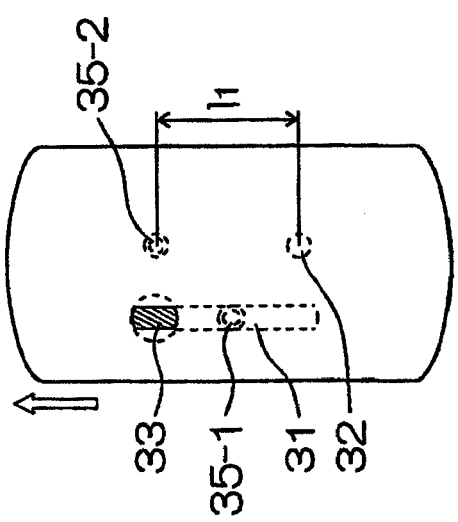

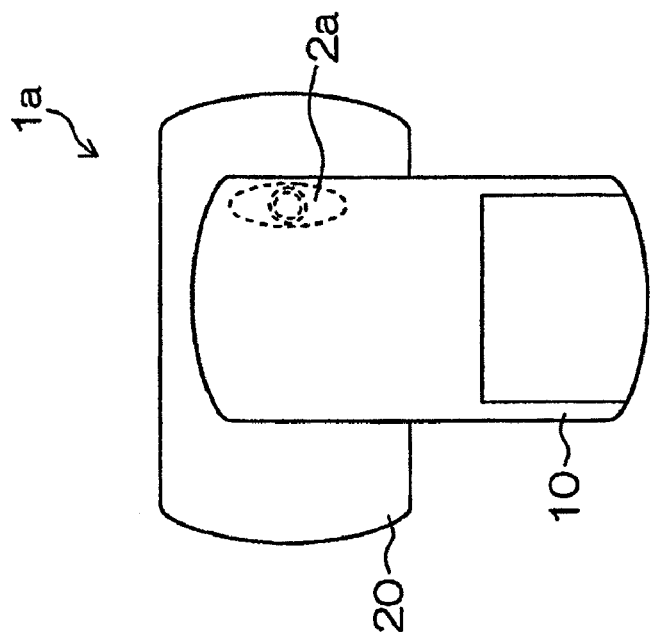
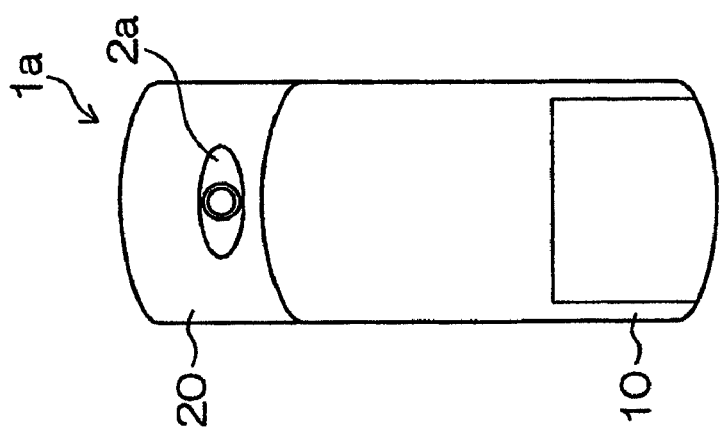
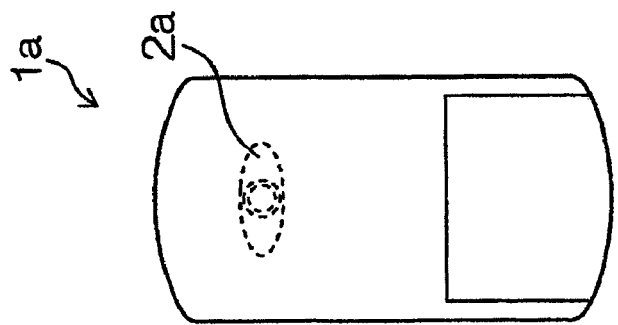

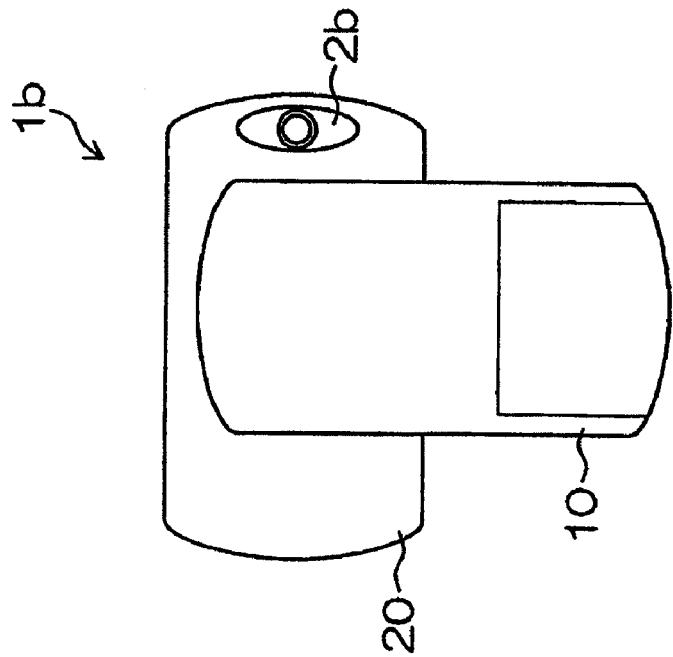
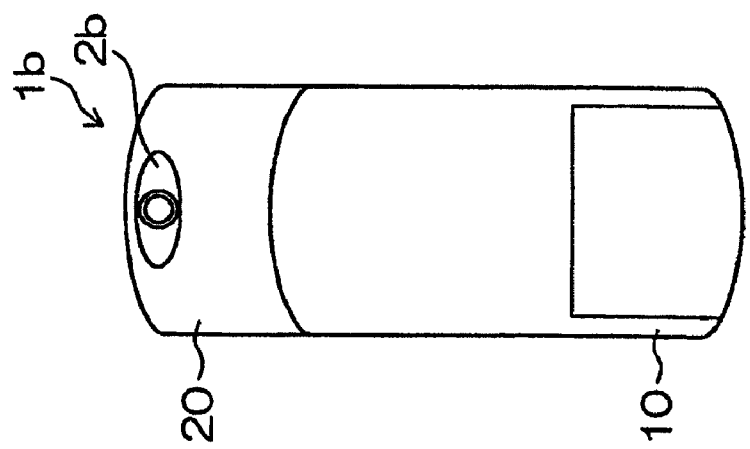
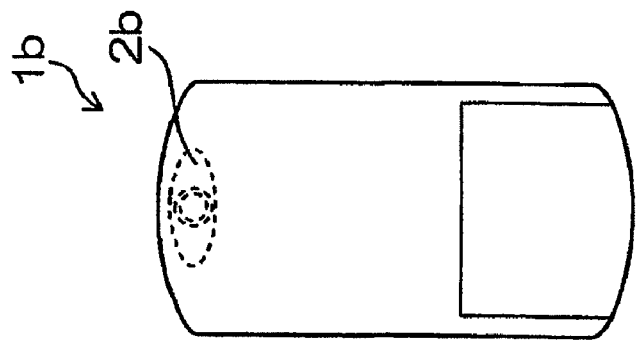

FIG.14A
FIG.14B
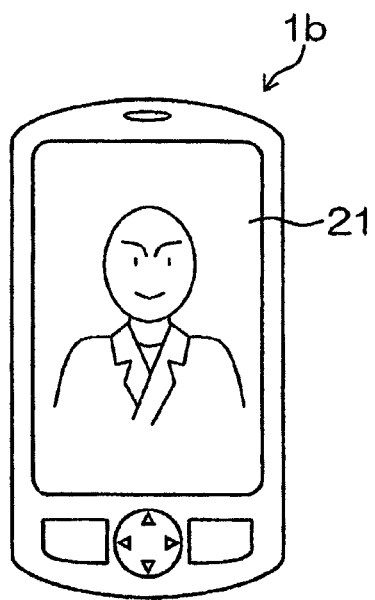
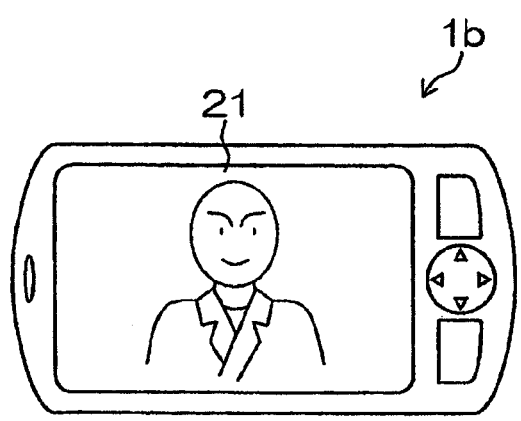

FIG.15A
FIG.15B
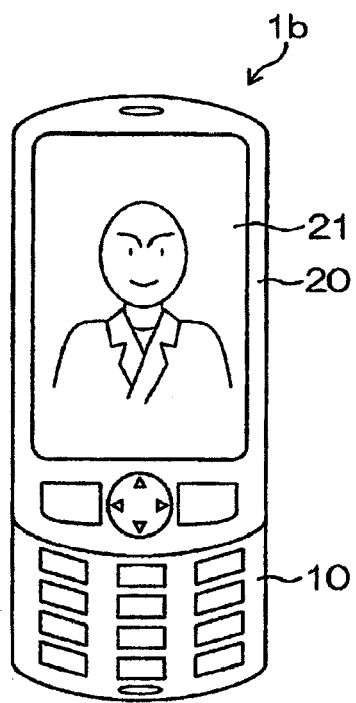
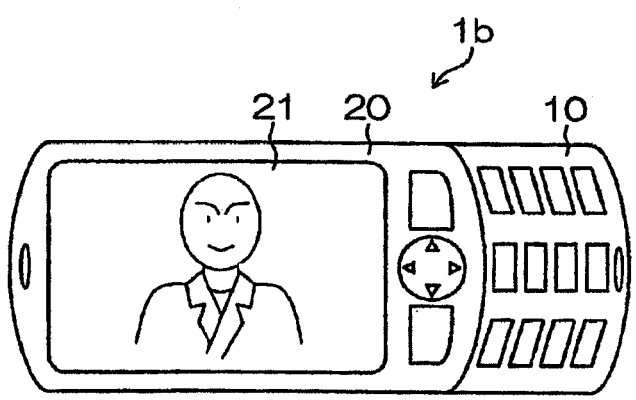

FIG.16A
FIG.16B
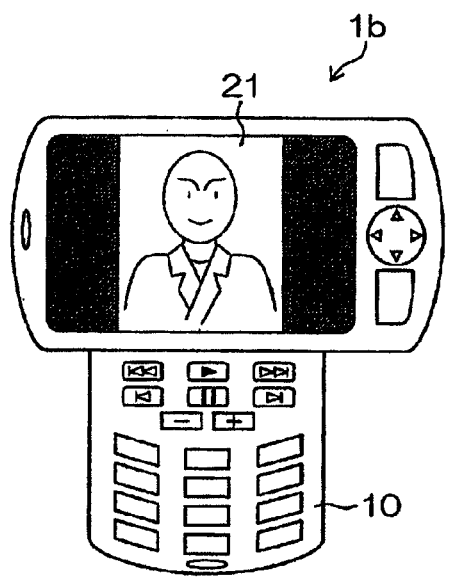
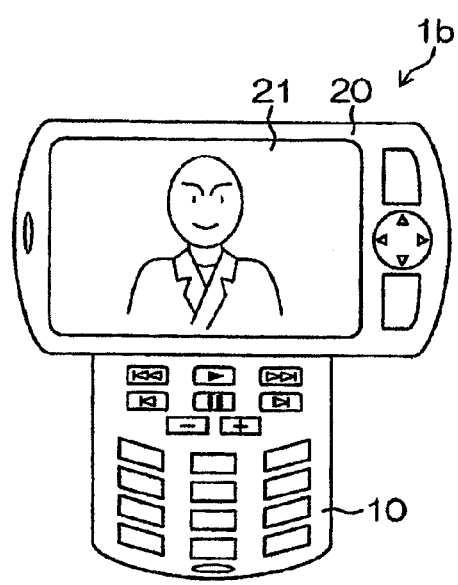

PORTABLE DEVICE

This application is a divisional of U.S. Ser. No. 11/865,236, filed Oct. 1, 2007, which claims priority to JP 2006-269385, filed Sep. 29, 2006, each of which is hereby incorporated by reference in its entirety.

BACKGROUND OF THE INVENTION

1. Field of the Invention

The present invention relates to a portable device, and relates in particular to a foldable portable device.

2. Description of the Related Art

As a portable device, a foldable type is known which openablely and closably joints two enclosures, one with a display device and the other with an operating part, through a hinge. Such a portable device of a foldable type is allowed to be provided in a compact state which is convenient for carrying by making a folded and closed state where the display device and the operation part face each other.

Such a portable device of a foldable type is occasionally provided with a television receiving function. In general, a display device of the portable device of a foldable type is formed into a vertically-long shape. However, in order to enhance visibility for information to be displayed horizontally such as television images, a horizontally-long display device is occasionally desired.

In order to correspond therewith, Japanese Patent Application Laid-Open No. 2005-38217 proposes a portable device which includes a display device enclosure and an operation part enclosure to be combined with a dual-axes hinge so that the display device enclosure can be opened in two directions of the long-side direction and the short-side direction to the operation part enclosure.

In addition, Japanese Patent Application Laid-Open No. 2005-115536 proposes a portable device which includes a main body and a flip part being deformable into a variety of modes by mutually and rotatably combining the main body and the flip part with a hinge including three rotary axes.

SUMMARY OF THE INVENTION

However, portable devices described in Japanese Patent Application Laid-Open No. 2005-38217 and Japanese Patent Application Laid-Open No. 2005-115536 are disadvantageous in following points. That is, portable devices described in Japanese Patent Application Laid-Open No. 2005-38217 and Japanese Patent Application Laid-Open No. 2005-115536 require a plurality of operations with the both hands in the case where two enclosures in the folded and stored state are brought into one of the state with a display device being used vertically and the state with the display device being used horizontally, giving rise to troubles in operation.

In addition, the portable devices described in Japanese Patent Application Laid-Open No. 2005-38217 and Japanese Patent Application Laid-Open No. 2005-115536 give rise to a problem that it is necessary to use a hinge with a plurality of shafts, which is expensive and has a complicated mechanism.

In addition, the portable device described in Japanese Patent Application Laid-Open No. 2005-38217 gives rise to a problem that it is difficult to operate because the operation part will be horizontally directed at the same time when the display device is horizontally directed in the case where the display device is horizontally made.

The present invention has been made in view of such circumstances. In one of the case of vertical use and the case of horizontal use, the display device can be easily brought into a use state from a storage state with a single hand.

In order to attain the above described objects, a first aspect of the present invention is to provide a portable device comprising a first enclosure; a second enclosure to which a display device for displaying at least one of characters and images is arranged; a joint mechanism which joints the first enclosure and the second enclosure together, wherein the joint mechanism brings the first enclosure and the second enclosure into movable linkage between a first position and a second position, and movable linkage between the first position and a third position which is different from the second position.

In the first aspect, the first position may be a position where silhouettes of the first enclosure and the second enclosure are overlapped, the second position may be a position where the second enclosure is moved in parallel from the first position, and the third position may be a position where the second enclosure is rotatably moved at a predetermined angle from the first position.

According to the portable device of such aspect, the first enclosure and the second enclosure are brought into movable linkage between the first position where the silhouettes of the first enclosure and the second enclosure are overlapped and the second position where the second enclosure is moved in parallel from the first position. In addition, the first enclosure and the second enclosure are rotatably and movably jointed between the first position and the third position where the second enclosure is rotatably moved from the first position at a predetermined angle.

In the first aspect, the second enclosure moves in a plane including a surface of the first enclosure which is to be overlapped with the second enclosure.

Thereby, the second enclosure can be moved easily with a single hand from the first position being a storage state to the second position with a display device being directed vertically and from the first position being the storage state to the third position with the display device being directed horizontally.

A portable device according to a second aspect of the present invention comprises a first enclosure; a second enclosure to which a display device for displaying at least one of characters and images is arranged; a joint mechanism which joints the first enclosure and the second enclosure together; an operation device configured by a plurality of operation parts which inputs a command to the portable device, wherein the joint mechanism brings the first enclosure and the second enclosure into movable linkage between a first position and a second position, and movable linkage between the first position and a third position, and wherein the operation device is arranged in the second enclosure so that mutually different operation parts among the plurality of operation parts are exposed in the second position and the third position to become operable.

In the second aspect, the first position may be a position where silhouettes of the first enclosure and the second enclosure are overlapped, the second position may be a position where the second enclosure is moved in parallel from the first position, and the third position may be a position where the second enclosure is rotatably moved at a predetermined angle from the first position.

According to the portable device of to such aspect, the first enclosure and the second enclosure are movably jointed between the first position where the silhouettes of the first enclosure and the second enclosure are overlapped and the second position where the second enclosure is moved in parallel from the first position; and the first enclosure and the second enclosure are jointed rotatably and movably between the first position and the third position where the second enclosure is rotatably moved from the first position at a predetermined angle, the mutually different operation parts are exposed in the second position and the third position. Thereby only the operation parts thereof become operable.

In the second aspect, the second enclosure moves in a plane including a surface of the first enclosure which is to be overlapped with the second enclosure.

Thereby, only the required operation parts are exposed in the first position, the second position and the third position and, therefore, operability can be made better.

In the first or second aspect, when the portable device is in the first position, silhouette of the first enclosure is substantially overlapped with the silhouette of the second enclosure. As a result of this, when viewing the portable device from its front, the first or second enclosure is hidden by the other enclosure.

A portable device according to a third aspect of the present invention is the portable device according to the first and the second aspects of the present invention comprising a control device which controls movement of the second enclosure, wherein the control device controls movement of the second enclosure so as to enable movement in parallel and rotary movement of the second enclosure in the first position; enable only movement in parallel of the second enclosure in the second position; and enable only rotary movement of the second enclosure in the third position.

According to the portable device of the third aspect, the movement in parallel and the rotary movement of the second enclosure is enabled in the first position; only the movement in parallel of the second enclosure is enabled in the second position; and the movement of the second enclosure is restricted so as to enable only the rotary movement of the second enclosure in the third position. Thereby, the second enclosure is movable only between the first position and the second position and between the first position and the third position.

Thereby, the movement of the second enclosure is restricted so as not to enable unnecessary operation. Therefore, the second enclosure can be moved more easily with a single hand from the first position being a storage state to the second position with the display device being vertically directed and from the first position being a storage state to the third position with the display device being horizontally directed.

A portable device according to a fourth aspect of the present invention is the portable device according to one of the first, second and third aspect of the present invention including a halt mechanism which halts the second enclosure at the first position, the second position and the third position respectively with predetermined retaining forces, wherein the halt mechanism is arranged at a portion where the first enclosure and the second enclosure are overlapped in the first position, the portion between the first enclosure and the second enclosure.

According to the portable device of the fourth aspect, the second enclosure is halted in the first position, the second position and the third position with a predetermined retaining force by a halt mechanism being a portion where the first enclosure and the second enclosure are overlapped together in the first position and being arranged between the first enclosure and the second enclosure.

Thereby, the second enclosure is halted in the first position being the storage state, the second position with the display device being directed vertically and the third position. Therefore, in the case where the second enclosure is moved to a predetermined position, the operation which moves the second enclosure will become easy.

A portable device according to a fifth aspect of the present invention is the portable device according to any one of the first to fourth aspects of the present invention comprising a detection device which detects positional relation between the first enclosure and the second enclosure; and a control device which carries out one of switching of operation modes of the portable device and restriction of usable operation modes based on the positional relation between the first enclosure and the second enclosure detected by the detection device.

According to the portable device of the fifth aspect, the detection device detects the positional relation between the first enclosure and the second enclosure, that is, which position the first enclosure and the second enclosure are positioned among the first position, the second position and the third position. Based on the detected positional relation between the first enclosure and the second enclosure, one of the operation switching mode of a portable device and restriction on the usable operation mode is carried out.

Thereby, the second enclosure can be moved more easily with a single hand from the first position being a storage state to the second position with the display device being vertically directed and from the first position being a storage state to the third position with the display device being horizontally directed and concurrently switching of the operation mode is carried out. Therefore, operability of the portable device can be made better.

A portable device according to a sixth aspect of the present invention is the portable device according to any one of the first to fifth aspects of the present invention, wherein an image pickup part of a camera for picking up images of a subject is arranged on a plane opposite to the plane where the first enclosure is jointed to the second enclosure.

According to the portable device according the sixth aspect, the image pickup part of a camera is arranged on a plane opposite to the plane where the first enclosure is jointed to the second enclosure, that is, the image pickup part of a camera is arranged in the first enclosure so that the image pickup part is exposed on the surface.

Thereby, the image pickup part is always exposed. Therefore, the snapshot performance can be improved.

A portable device according to a seventh aspect of the present invention is the portable device according to any one of the first to fifth aspects of the present invention, wherein an image pickup part of a camera is arranged in the second enclosure opposite to the display device so that the image pickup part is exposed so as to allow image pickup of a subject in the case where the second enclosure is present in the second position and the image pickup part is covered by the first enclosure in the case where the second enclosure is present in the third position.

According to the portable device of the seventh aspect, the image pickup part is exposed in the case where the second enclosure is present in the second position. Therefore, the subject can undergo image pickup operation. In addition, in the case where the second enclosure is present in the third position, the image pickup lens is covered by the first enclosure. Therefore, the image pickup lens is protected.

Thereby, during storage, in such a case where the camera is not used that a portable device is operated in a television mode, the image pickup lens is covered by the first enclosure. Therefore, the image pickup lens can be protected.

A portable device according to an eighth aspect of the present invention is the portable device according to the seventh aspect of the present invention including a detection device which detects positional relation between the first enclosure and the second enclosure; and a control device which carries out one of switching of operation modes of the portable device and restriction of usable operation modes based on the positional relation between the first enclosure and the second enclosure detected by the detection device, wherein the control device an electronic camera mode in the second position to operate and enables a television mode to operate in the third position among all the operation modes including the electronic camera mode and the televisions mode of the portable device.

According to the portable device of the eighth aspect, in the case where the electronic camera is arranged in the second enclosure so that the image pickup lens is exposed in the case where the second enclosure is present in the second position and the image pickup lens is covered by the first enclosure in the case where the second enclosure is present in the third position, the portable device is controlled by a control device so as to enable an electronic camera mode in the second position to operate and to enable a television mode to operate in the third position among all the operation modes including the electronic camera mode and the televisions mode of the portable device.

Thereby, the portable device is controlled at a required position in the required operation mode. Therefore, operability of the portable device can be made good.

A portable device according to a ninth aspect of the present invention is the portable device according to any one of the first to fifth aspects of the present invention, wherein an image pickup part of a camera is arranged in the second enclosure opposite to the display device so that the image pickup part is covered by the first enclosure in the case where the second enclosure is present in the first position and the image pickup part is exposed so as to enable image pickup of a subject in the case where the second enclosure is present in the second position and the third position.

According to the portable device of the ninth aspect, the image pickup part is protected since the image pickup part is covered by the first enclosure in the case where the second enclosure is present in the first position. In addition, in the case where the second enclosure is in the second position and the third position, the image pickup part is exposed to enable image pickup of the subject.

Thereby, the second enclosure is moved between the second position where vertical image pickup is carried out and the third position where the horizontal image pickup is carried out. Thereby switching between vertical image pickup and horizontal image pickup can be carried out easily with a single hand. In addition, switching between the second position where vertical image pickup is carried out and the third position where the horizontal image pickup is carried out can be carried out easily. Therefore, while the appliance is being retained as is, vertical image pickup and horizontal image pickup will become feasible without rotating the appliance.

A portable device according to a tenth aspect of the present invention is a portable device comprising: a first enclosure; a second enclosure to which a display device for displaying at least one of characters and images is arranged; a joint mechanism which joints the first enclosure and the second enclosure together; an image pickup part of a camera which is arranged in the second enclosure opposite to the display device; and a detection device which detects positional relation between the first enclosure and the second enclosure, wherein the camera attaches image pickup posture information designating whether the image having undergone image pickup is one of an image of vertical image pickup and an image of horizontal image pickup to the image having undergone the image pickup based on the positional relation between the first enclosure and the second enclosure detected by the detection device.

According to the portable device of the tenth aspect, the positional relation between the first enclosure and the second enclosure, that is, whether the first enclosure and the second enclosure are present in which position among the first position, the second position and the third position is detected by the a detection device. Based on the positional relation between the detected first enclosure and second enclosure, the image pickup posture information designating whether the image having undergone image pickup is one of an image of vertical image pickup and an image of horizontal image pickup is attached to the image having undergone the image pickup.

Thereby, image pickup posture information designating one of the image of the vertical image pickup and the image of the horizontal image pickup is attached to the image having undergone image pickup by vertical image pickup in the second position and by horizontal image pickup in a third position, and the information is used at an occasion of reproduction to enable, thereby, enhancement in visibility.

A portable device according to an eleventh aspect of the present invention is a portable device comprising: a first enclosure; a second enclosure to which a display device for displaying at least one of characters and images is arranged; a joint mechanism which joints the first enclosure and the second enclosure together; an image pickup part of a camera which is arranged in the second enclosure opposite to the display device; and a subject image output device which outputs and displays the subject image acquired with a camera and to the display device as a live image, wherein the subject image output device changes the direction of the subject image based on the detected result of the detection device which detects the positional relation between the first enclosure and the second enclosure.

According to the portable device of the eleventh aspect, in the case of outputting, to the display device, the live image acquired by the electronic camera, that is, a through image, the direction of the subject image to be output is changed based on the detection result of the detection device which detects the positional relation between the first enclosure and the second enclosure.

Thereby, the direction of the image displayed according to the direction of the display device at an occasion of the image pickup is changed. Therefore, operability of the portable device can be made good.

A portable device according to a twelfth aspect of the present invention is a portable device comprising: a first enclosure; a second enclosure to which a display device for displaying at least one of characters and images is arranged; a joint mechanism which joint the first enclosure and the second enclosure together; an image pickup part of a camera which is arranged in the second enclosure opposite to the display device; and a reproducing device which displays an image on the display device, wherein the reproducing device displays the image so as to erect on the screen of the display device based on the positional relation between the first enclosure and the second enclosure which were detected by the detection device and the image pickup posture information that designates the image added to the image for reproduction and having undergone image pickup is one of an image subjected to vertical pickup and an image subjected to horizontal image pickup.

According to the portable device of the twelfth aspect, the image is displayed so as to erect on the screen of the display device based on the positional relation between the first enclosure and the second enclosure which were detected by the detection device and the image pickup posture information that designates the image added to the image for reproduction and having undergone image pickup is one of an image subjected to vertical pickup and an image subjected to horizontal image pickup Thereby, the direction of the image having undergone image pickup and the direction displayed by the direction of the display device are automatically changed. Therefore, operability of the portable device can be made good.

It is noted that in the above-described aspects, parts of the camera except for the image pickup part may be arranged in either of the first enclosure and the second enclosure.

The present invention can provide a portable device which can be brought into a use state from the storage state with one hand easily also in one of the case of using the display device in a vertical state and the case of using the display device in a horizontal state.

BRIEF DESCRIPTION OF THE DRAWINGS

FIGS. 1A, 1B and 1C are diagrams for illustrating appearance of a first embodiment of a portable device to which the present invention is applied, FIG. 1A being a diagram for illustrating a storage state where silhouettes of a first enclosure and a second enclosure are overlapped, FIG. 1B being a diagram for illustrating a use stage at a second position with a display device being directed vertically and FIG. 1C being a diagram for illustrating a third position with the display device being directed horizontally;

FIGS. 5A-1, FIG. 5A-2 and FIG. 5B are diagrams for illustrating a cross-section of a first embodiment of the portable device, FIG. 5A-1 being a diagram for illustrating a first position where silhouettes of the first enclosure and the second enclosure are overlapped, FIG. 5A-2 being a diagram for illustrating a state where a second enclosure have been moved in parallel from the first position to a second position and FIG. 5B being a diagram for illustrating a state where the second enclosure is in the second position subjected to movement in parallel from the first position;

FIG. 6 is a block diagram for illustrating an example of an internal configuration of the first embodiment of the portable device;

FIGS. 7A, 7B and 7C are diagrams for illustrating perspective vies of a joint part 30 of the first embodiment of the portable device in phantom, FIG. 7A being a diagram for illustrating a first position where silhouettes of the first enclosure and the second enclosure are overlapped, FIG. 7B being a diagram for illustrating a state where the second enclosure is in the second position subjected to movement in parallel from the first position; and FIG. 7C being a diagram for illustrating the second enclosure in a state in the third position subjected to rotary movement from the first position;

FIG. 8A being a diagram for illustrating a storage state where silhouettes of the first enclosure and the second enclosure are overlapped, FIG. 8B being a diagram for illustrating a use stage at a second position with a display device being directed vertically and FIG. 8C being a diagram for illustrating a third position with the display device being directed horizontally;

FIGS. 10A, 10B and 10C are diagrams for illustrating an appearance of a second embodiment of a portable device to which the present invention has been applied, FIG. 10A being a diagram for illustrating a storage state where silhouettes of a first enclosure and a second enclosure are overlapped, FIG. 10B being a diagram for illustrating a use stage at a second position with a display device being directed vertically and FIG. 10C being a diagram for illustrating a third position with the display device being directed horizontally;

FIGS. 11A, 11B and 11C are diagrams for illustrating an appearance of a third embodiment of a portable device, FIG. 11A being a diagram for illustrating a storage state where silhouettes of a first enclosure and a second enclosure are overlapped, FIG. 11B being a diagram for illustrating a use stage at a second position with a display device being directed vertically and FIG. 11C being a diagram for illustrating a third position with the display device being directed horizontally;

FIGS. 14A and 14B are display examples in a still image display mode in a first position of the third embodiment of the portable device;

FIGS. 15A and 15B are display examples in a still image display mode in a second position of the third embodiment of the portable device; and FIGS. 16A and 16B are display examples in a still image display mode in a third position of the third embodiment of the portable device.

DETAILED DESCRIPTION OF THE PREFERRED EMBODIMENTS

Figure 2:
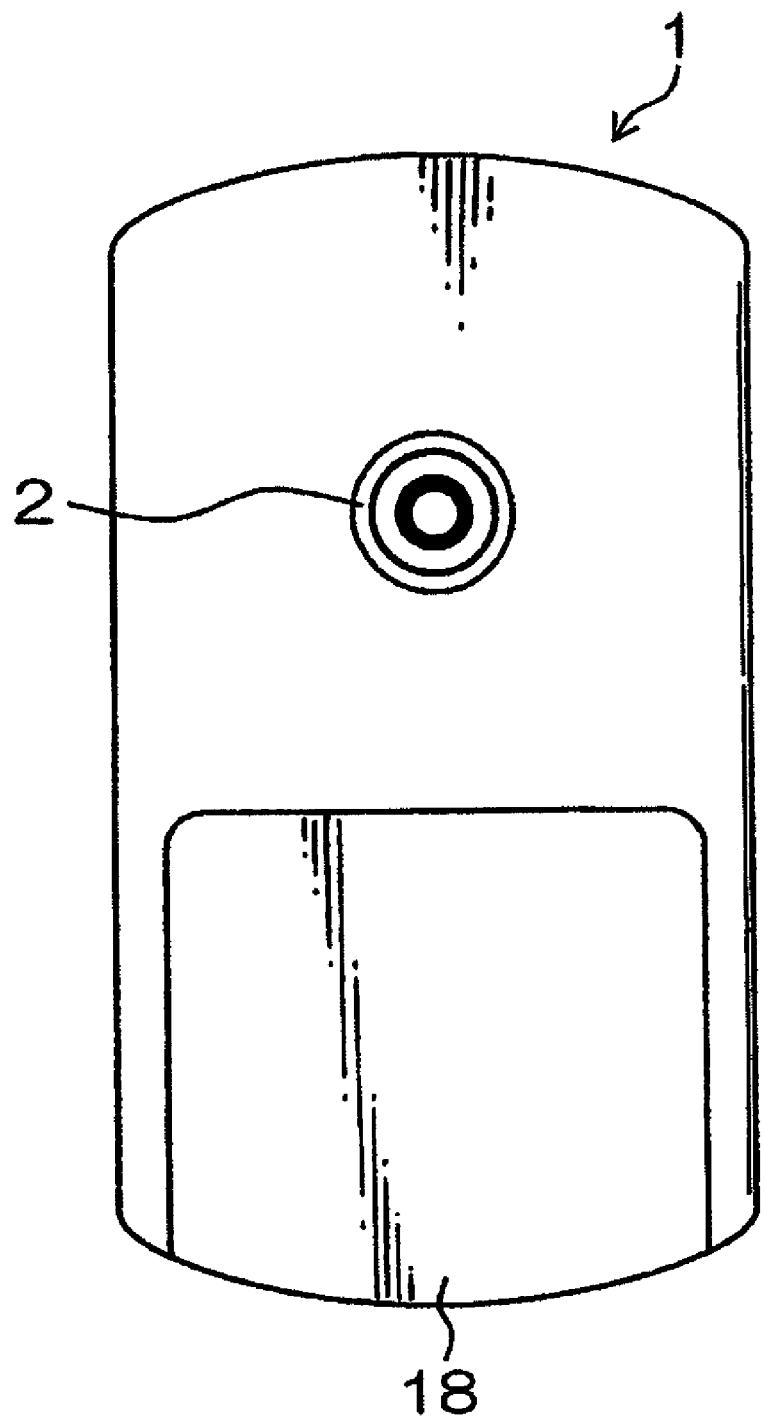
FIG. 2 is a diagram for illustrating an appearance of the first embodiment of the portable device.

The best mode for carrying out an electronic camera related to the present invention will be described in detail according to the accompanying drawings.

First Embodiment

FIGS. 1A, 1B and 1C are diagrams for illustrating an appearance of a portable device 1 of a first embodiment related to the present invention, FIG. 1A being a diagram for illustrating a storage state where silhouettes of a first enclosure and a second enclosure are overlapped, FIG. 1B being a diagram for illustrating a use state at a second position with a display device being directed vertically and FIG. 1C being a diagram for illustrating a third position with the display device being directed horizontally.

A portable device 1 is a portable device such as a portable telephone, for example, which can be folded, that is, has a first enclosure and a second enclosure with silhouettes thereof being overlapped and is configured mainly by a first enclosure 10 comprising operation buttons including dial keys 12 and the like, a second enclosure 20 comprising display 21 which displays information such as images; and a connecting part 30 which connects the first enclosure 10 and the second enclosure 20.

Figures 1, 5A:
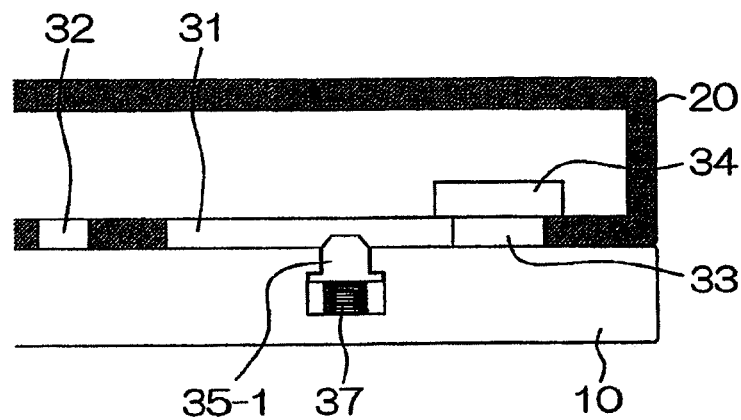
Figures 2, 5A:
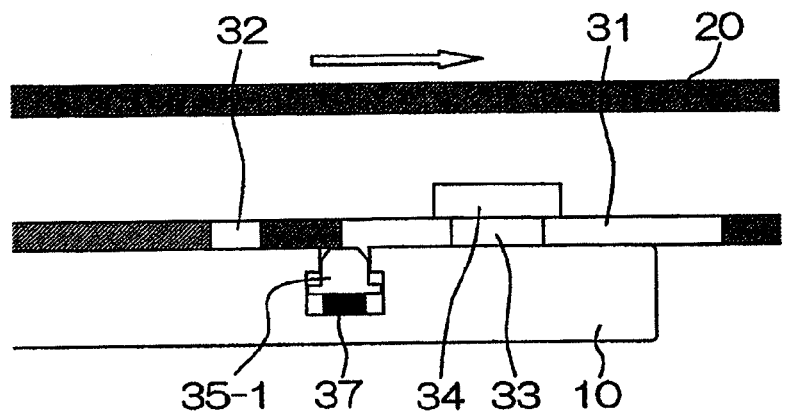

The first enclosure 10 is substantially a rectangular solid in which a first operation part 41a mainly including dial keys 12, a call button 13, a call concluding button 14, a mode button 15, television operation parts 16, audio volume buttons 17, a microphone 11 and the like is arranged as illustrated in FIG. 1 on a plane to become the inner side in a first position.

In addition, on a plane opposite to the plane where the first operation part 41a, the microphone 11 and the like are arranged, mainly an image pickup part 2 of a camera, a power supply storage 18 and the like are arranged as illustrated in FIG. 2. It is noted that parts of the camera except for the image pickup part may be arranged in either of the first enclosure and the second enclosure.

The second enclosure 20 is, likewise the first enclosure 10, substantially a rectangular solid in which a second operation part 41b mainly consisting of an arrow button 23, a second call button 24 and a second call-ending button 25, a rectangular display 21 giving a predetermined aspect ratio, a speaker 22 and the like are arranged on a plane to become the outer side in a folded state.

In addition, inside the first enclosure, mainly a main substrate provided with a CPU and the like for processing signals and the like, which are input by the first operation part 41a, the second operation part 41b and the like, and a battery and the like, which are not illustrated in the drawing, are arranged. The main substrate and the display 21 are brought into electric connection with a flexible printed board which passes inside the hinge but are omitted from illustration.

As illustrated in FIG. 1A, a state where silhouettes of the first enclosure and the second enclosure are overlapped, that is, a first position is a portable state and a storage state. In that case, only the second operation part 41b, which is arranged in the second enclosure, is exposed on the front surface and can be operated. That is, basic operations such as a power supply, a call, a call counterparty selection and determination and the like are allocated to the second operation part 41b so that response to a call having come and calling to an already registered call counterparty can also be made in the first position.

As illustrated in FIG. 1B, in the second position where the second enclosure 20 has been moved from the first position in parallel in the plane of the first enclosure 10, dial keys 12, a call button 13, a call-ending button 14 and a mode button 15 among the first operation part 41a arranged in the first enclosure 10 is exposed and can be operated. The dial keys 12, the call button 13, the call-ending button 14 and the mode button 15 are main operation buttons for telephone and enable calls to arbitrary numbers, e-mail inputting, e-mail transmission and reception and the like.

In addition, in the second position, the microphone 11 is exposed so that positional relation thereof is made apart in distance that is convenient for a call. Thereby, by applying the microphone 11 and the speaker 22 to an ear and a mouth respectively, a call is enabled with telephonic function and is user-friendly.

Here, in the first position and the second position, the display 21 is directed vertically.

As illustrated in FIG. 1C, the second enclosure 20 is rotated by 90° to move toward inside the plane of the first enclosure 10 from the first position to reach a third position, where the television operation part 16 and the audio volume button 17 are exposed further. Thereby, all the first operation parts 41a are exposed and can be operated. Media player operation functions such as play, stop, fast forwarding, rewinding and the like and television operation functions such as channel selection and the like are allocated to the television operation parts 16 to enable those operations.

In addition, in the third position, the display 21 will be directed horizontally so as to enable the horizontal full-window image display for a television set and the like.

Figure 3:
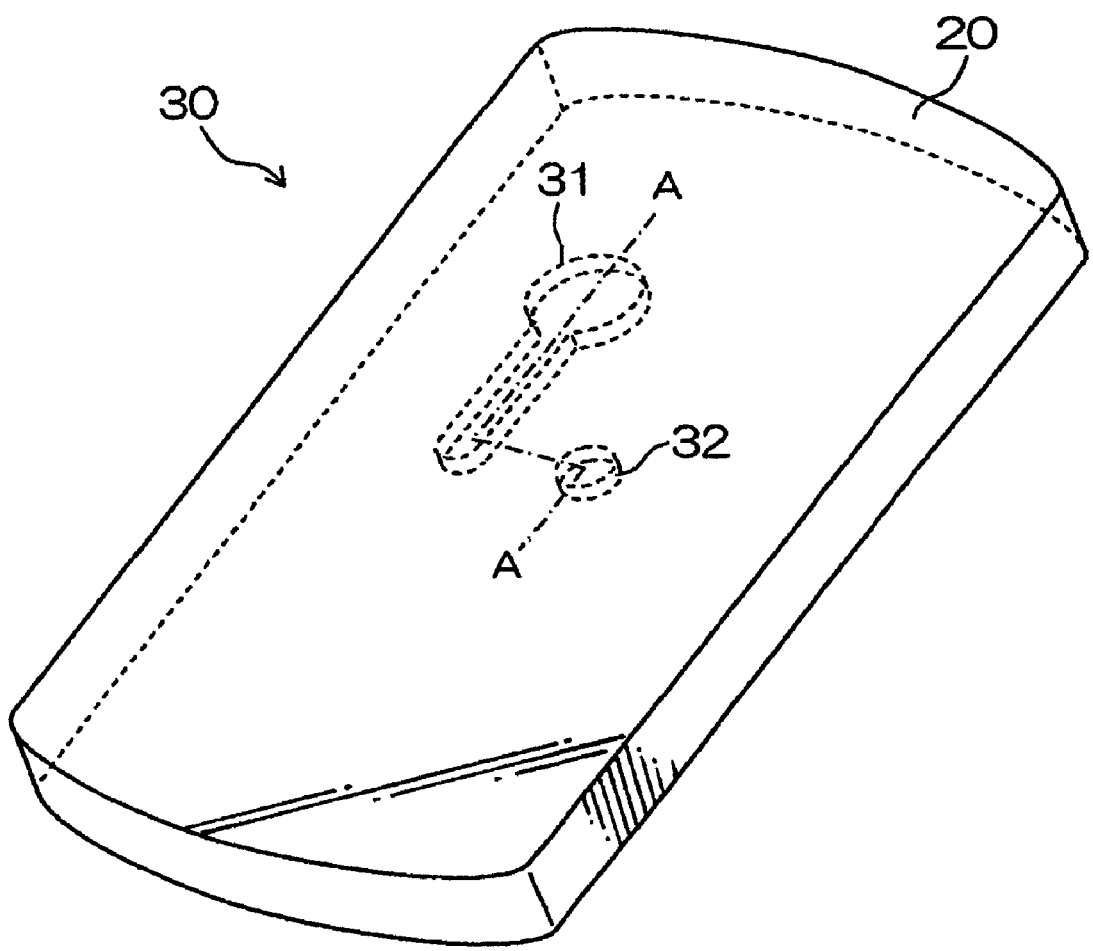
FIG. 3 is a diagram for illustrating a perspective view of key contents in phantom in the second enclosure 20 of the first embodiment of the portable device.
Figure 4:
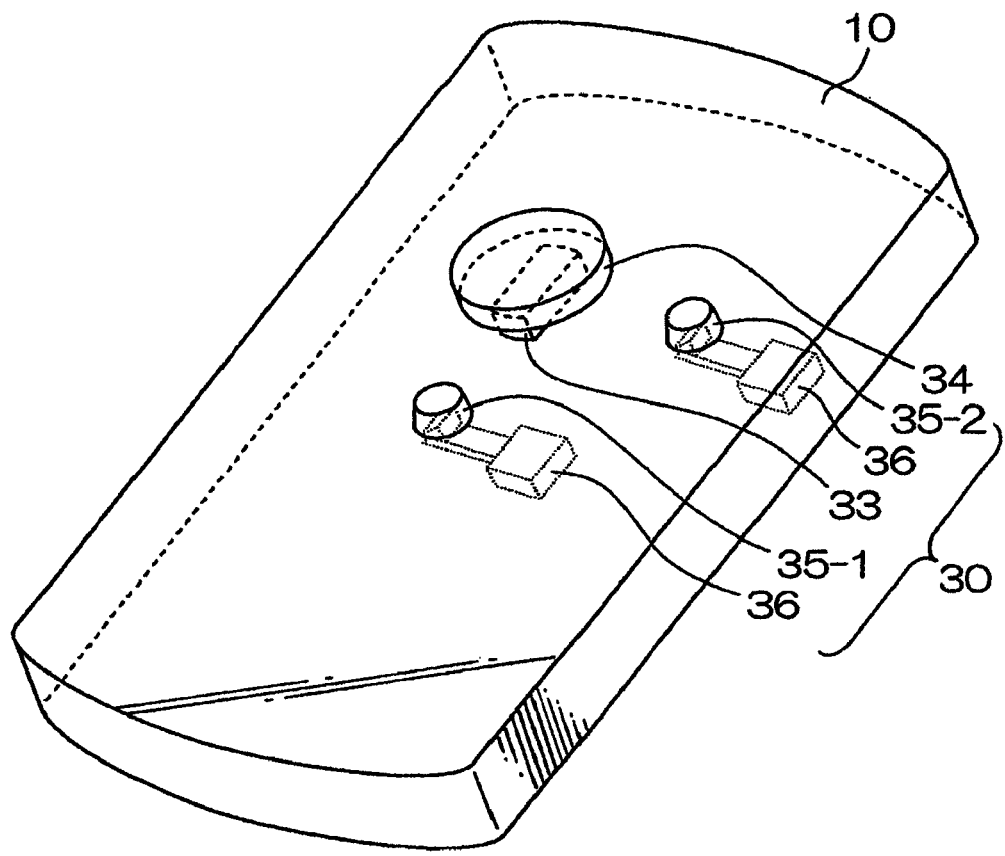
FIG. 4 is a diagram for illustrating a perspective view of key contents in phantom in the first enclosure 10 of the first embodiment of the portable device.

Next, the configuration of the connecting part 30 bringing the first enclosure and the second enclosure 20 into movable connection will be described. FIG. 3 and FIG. 4 are perspective diagrams for illustrating the configuration of the connecting part 30.

As described in FIG. 3, on the rear plane of the second enclosure 20, a key hole slit 31 and a circular hole 32 are arranged. In addition, as illustrated in FIG. 4, a key 33, disengagement prevention cap 34, lock pins 35-1 and 35-2, a detection switch 36 and a spring (not illustrated in the drawing) are arranged in the first enclosure 10.

The key hole slit 31 forms a shape with the circular hole part and the horizontal hole part brought into connection. The circular hole part allows a key 33 to rotate in its inside and is sized so as to prevent disengagement of a removal preventing cap 34. The long hole part is designed to allow the key 33 to slide in its inside.

The hole diameter of the circular hole 32 is designed to be larger than the diameters of the lock pins 35-1 and 35-2 so that the lock pins 35-1 and 35-2 can fit therein.

The key 33 is arranged outside the first enclosure 10 and is slidable inside the key hole slit 31.

The removal preventing cap 34 is arranged in the upper part of the key 33 and functions so that the key 33 is not removed from the key hole slit 31. Here, in FIG. 4, the removal preventing cap 34 is integral with the key 33. The reason thereof is that the shape after assembly is illustrated. The removal preventing cap 34 is incorporated into the key 33 by a method of mounting the removal preventing cap 34 and the like after the key 33 passes the key hole slit 31.

The lock pins 35-1 and 35-2 are urged in such a direction of protruding toward outside the first enclosure 10 with a spring from inside the first enclosure 10 and are allowed to be positioned in two ways of a position in protrusion toward outside the first enclosure 10 and a position subjected to a drop to the side of the first enclosure 10.

The detection switch 36 is arranged in the lower side of the lock pins 35-1 and 35-2 inside the first enclosure 10 and is capable of detecting whether the lock pins 35-1 and 35-2 are located in one of the position in protrusion to outside the first enclosure 10 and the position subjected to a drop toward the side of the first enclosure 10.

FIGS. 5A-1, 5A-2 and 5B are cross-sections in view of a state where the first enclosure 10 and the second enclosure 20 are brought into connection along the A-A cross-section in FIG. 3 and FIG. 4.

As illustrated in FIG. 5A-1, in the first position, the key 33 is fit in the circular hole part of the key hole slit 31. The removal preventing cap 34 is assembled in and with the key 33 from the inside the second enclosure 20. Thereby, the first enclosure 10 and the second enclosure 20 are jointed together so as not to set apart each other.

In addition, in the first position, the lock pin 35-1 is fit in the long hole part of the key hole slit 31. The lock pin 35 is urged in the direction of protruding to outside the first enclosure 10 by the spring 37 arranged in the first enclosure 10 and, nevertheless, is fit to the key hole slit 31 in the first position. Therefore the spring 37 is in a stretched state.

FIG. 5A-2 is a state where the second enclosure 20 is moved in parallel from the first position. But the lock pin 35-1 is pushed to the side of the first enclosure 10 against the force of the spring 37 by the second enclosure 20.

Figure 5B:
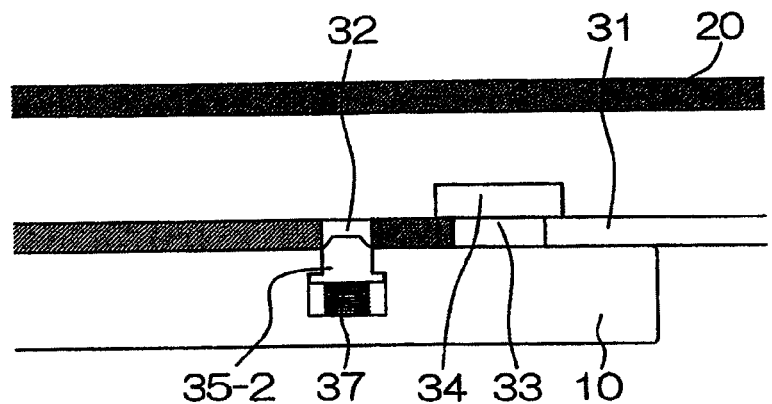

As illustrated in FIG. 5B, the lock pin 35-2 is pushed toward the side of the second enclosure 20 by the spring 37 in the second position so as to bring the lock pin 35-2 and the circular hole 32 into fitting.

Since the lock pin 35-2 is urged in the direction of protruding to outside the first enclosure 10 by the spring 37, the second enclosure is designed to come to a halt by the predetermined retaining force in the state where the lock pin 35-2 protrudes.

According to the joint part configured as described above, the first enclosure 10 and the second enclosure 20 are movably jointed.

FIG. 6 is a block diagram for illustrating an embodiment of internal configuration of the portable device 1.

As illustrated in the drawing, the portable device 1 includes a central processing unit (CPU) 40, memory 42, an audio processing part 44, a transmission and reception circuit 46 and the like besides the operation part 41 including the first operation part 41a and the second operation part 41b, the display 21, the microphone 11 and the speaker 22, and comprises a function for receiving television broadcast, a function for transmitting and receiving e-mail together with a normal telephone function.

The CPU 40 functions as a controller which controls entire operations of the portable device 1 according to a predetermined program and functions as an arithmetic apparatus which carries out various kinds of arithmetic operations. That is, the CPU 40 controls each circuit inside the portable device 1 based on the command signals which are input from the operation part 41 to carry out communication control, image pickup operation control, image processing control, display control of the display 21, read and write control of the memory 42, management of an address book and the like.

The memory 42 is connected to the CPU 40 through a bus 49 and is a block including a program which the CPU 40 executes, non-volatile memory (ROM) region where various kinds of data required for control are stored, a spreading region of the program and volatile memory (RAM) region utilized as a region for arithmetic operations for the CPU 40. The ROM region is utilized as an address book and a data storage region of call history and is utilized as a retaining region of audio and images. In addition, the RAM region is utilized as a temporary storage region of image data as well.

The audio processing part 44 is a device which brings the audio signals and into process and conversion in association with the CPU 40. The audio process part 44 carries out a decoding process of data in receipt from the transmission and reception circuit 46, a data coding process which carries out transmission through the transmission and reception circuit 46, a coding process of input audio signals from the microphone 11 and an output signal generation process to the speaker 22 and the like.

The transmission and reception circuit 46 converts signal form of data received by the antenna 48 and the data to be transmitted from the antenna 48.

In the call mode (mode for use of a telephone functions), when communication connection with a call counter party for a call is established, the audio which is input from the microphone 11 is converted into electric signals and is transmitted to the audio processing part 44. The audio processing part 44 converts the audio signal, which is input from the microphone 11, into a digital signal (A/D conversion), which thereafter undergoes the required signal process and is converted into an audio data of a predetermined form. The audio data (data for transmission) having undergone the process in the audio processing part 44 are transmitted to the transmission and reception circuit 46 through the bus 49 and are converted into a predetermined a signal form for transmission and thereafter transmitted from the antenna 48.

The signal received by the antenna 48 is demodulated in the transmission and reception circuit 46 and is transmitted to the audio processing part 44. The audio processing part 44 converts the audio signal in receipt from the transmission and reception circuit 46 into audio data of a predetermined form. The audio data (reception data) generated in the audio processing part 44 are converted into analog audio signal (D/A conversion) and thereafter is transmitted to the speaker 22. Thus, audio of the call counter party is audibly output from the speaker 22.

In the television mode, when the antenna 48 receives electric wave of the television broadcast, the signal of the television broadcast in receipt is divided into audio signals and video signal in the transmission and reception circuit 46.

The audio signal is input to the audio processing part 44 and output from the speaker 22.

On the other hand, the video signals are converted into digital signals in the transmission and reception circuit 46 and, thereafter, are output to the display 21 through the display circuit 60. Thereby, televised video is displayed in the display 21.

Here, the channel selection on the television in the transmission and reception circuit 46 is carried out by the left and right keys of the arrow button 23. That is, every push on the right key sends the channel forward one after another. Every push on the left key sends the channel backward one after another.

In addition, the television audio volume is controlled by the +key and the −key of the audio volume buttons 17. Every push on the +key make the audio volume louder stepwise and every push on the −key make the audio volume weaker stepwise.

In addition, that portable device 1 can transmit and receives various kinds of data such a image data, document data, program data and the like in utilization of e-mail functions, browser functions of the Internet and the like.

Moreover, the portable device 1 includes an image pickup lens 50 and a CCD image sensor (herein after to be referred to as CCD) 52 and comprises an analog processing part 54 which brings the image signals obtained from the CCD 52 into a process, an A/D converter 55, an image processing part 56 and a compressing and elongating part 57.

Light having passed the image pickup lens 50 is focused on a light receiving plane of the CCD 52. On the light receiving plane of the CCD 52, a great number of photosensor (light receiving element) are arrayed two-dimensionally. Corresponding with the respective photosensors, elementary color filters of red (R), green (G) and blue (B) are arranged in a predetermined array structure.

A subject image formed on the light receiving plane of the CCD 52 is converted by the respective optical photosensors into signal charges in a quantity corresponding with the incident optical amount. The CCD 52 has an electronic shutter function which controls electric charging time (shutter speed) of the respective photosensors with timing of shutter pulse.

Signal electric charge accumulated in the respective photosensor of the CCD 52 is sequentially read as voltage signal (image signal) corresponding with the signal electric charge based on pulse (horizontal drive pulse (pH, vertical drive pulse φV and overflow drain pulse) provided from the timing generator (TG) 58 according to a command of the CPU 40. The image signal which is output from the CCD 52 is transmitted to the analog processing part 54 to undergo a required process such as a correlation double sampling (CDS) process and gain adjustment and thereafter is converted to a digital signal by the A/D converter 55. The digitalized image data is transmitted to the image processing part 56.

The image processing part 56 is a digital image signal processing device including a synchronization circuit (a processing circuit which calculates color of each point by interpolating special displacements of color signals accompanied by color filter array of a signal plate CCD), a luminance and color difference signal generation circuit, a gamma correction circuit, an outline correction circuit, a contour correction, white balance correction circuit and the like and puts the memory 42 into practical use according to commands from the CPU 40 to process image signals.

In the image processing part 56, image data that are generated after undergoing predetermined processes such as white balance adjustment process, gamma conversion process, conversion process to resonance signal (Y signal) and color difference signal (YC process) are stored temporarily in the memory 42. Here, in the case of displaying video in the midst of image pickup on a display 21, the contents of that memory 42 are read and transmitted to the display circuit 60 and converted into a format of signal for display in the display circuit 60 and, thereafter, supplied to the display 21. Thereby, the live image (through image) captured by the CCD 52 is displayed on the display 21. The picture taker can confirm the image pickup image angle (composition) with the display video on the display 21.

Image pickup button in the operation part 41 (for example, one of any button in the operation part 41 allocated at an occasion of the image pickup mode and dedicated image pickup button) is pushed and otherwise there gives arises an incoming call during the setting of the incoming call release mode to be described later and the, the CPU 40 detects the occurrence to execute the image pickup operation. That is, exposure control and read control on electric charge is carried out in the CCD 52.

The image data thus taken in undergo a YC process the other predetermined signal process in the image processing part 56 and, thereafter, are transmitted to the compression and expansion part 57 and are compressed according to a predetermined compression format (for example, JPEG format). The compressed image data are stored in the image storage region in the memory 42.

At an occasion of reproducing an image, corresponding with the file selection operation of a user and otherwise automatically, the data of the image file are read from the memory 42. The compressed data read from the memory 42 are expanded by the compressing and expanding part 57, converted into a signal from displaying through the display circuit 60 and thereafter are output to the display 21. Thereby, the image contents of the relevant file are displayed on the display 21.

Next, operations of the portable device 1 of the present embodiment configured as above will be described.

A method of moving the first enclosure 10 and the second enclosure 20 from the first position to one of the second position and the third position will be described.

FIGS. 7A, 7B and 7C are diagrams for illustrating perspective views a joint part 30 in phantom, FIG. 7A being a diagram for illustrating a first position where silhouettes of the first enclosure and the second enclosure are overlapped, FIG. 7B being a diagram for illustrating a state where the second enclosure is in the second position subjected to movement in parallel from the first position; and FIG. 7C being a diagram for illustrating the second enclosure in a state in the third position subjected to rotary movement from the first position.

As illustrated in FIG. 7A, in the first position, a key 33 is fit in a circular hole part of a key hole slit 31. The straight-line part of the key 33 is in parallel to a straight-line part in an elongated hole part of the key hole slit 31. Therefore, as designated by an arrow in FIG. 7A, the second enclosure 20 can be moved upward in parallel. Here, in the first position, since the key 33 is brought into contact to the circular hole part of the key hole slit 31 and the lock pin 35-1 is fit in the elongated hole part of the key hole slit 31, the second enclosure 20 is halted by a predetermined retaining force at the first position.

A method of the second enclosure 20 being moved from the first position to the second position in parallel will be presented.

Figure 8A:
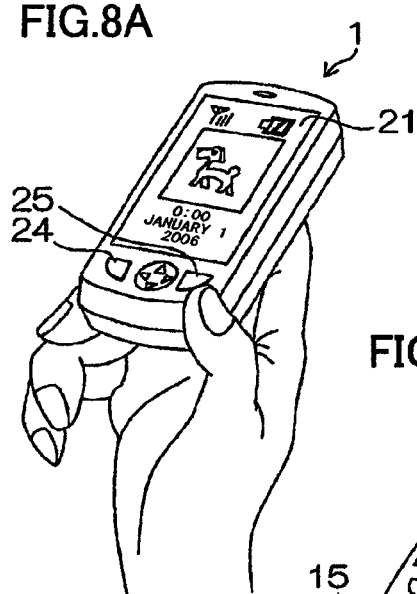
FIGS. 8A, 8B and 8C are explanatory diagrams for illustrating a method of using the first embodiment of a portable device.
Figure 8B:
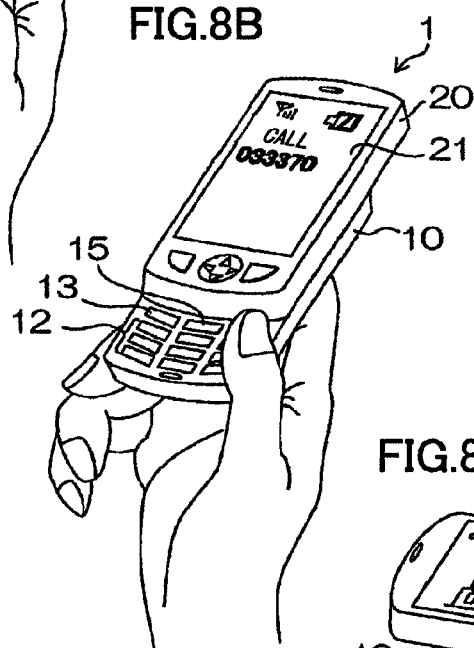

From the states of FIG. 7A and FIG. 8A, as illustrated in FIG. 8B, the first enclosure 10 is retained by a right hand and the second enclosure 20 is displaced upward by the thumb of the right hand. The second enclosure 20 moves upward in parallel and moves from the state in FIG. 7A to the second position as illustrated in FIG. 7B. In that case, the key 33 fit in the circular hole part of the key hole slit 31 is fit in the elongated hole part. Therefore, the rotary movement of the second enclosure 20 is restricted so that only parallel movement is enabled.

As illustrated in FIG. 7B, the key 33 is moved to be positioned in an end of the elongated hole part of the key hole slit 31, that is, the second enclosure 20 is moved upward only by the length $l_1$. Then in the first position, the positions of the circular hole 32 and the lock pin 35-2, which are mutual apart by the length $l_1$, come into matching so that the lock pin 35-2 is fit in the circular hole 32 which is present in the tip of the straight line part of the key hole slit 31 to lock the second enclosure 20. Therefore, the second enclosure 20 is halted by a predetermined retaining force at the second position. The key 33 is fit in the elongated hole part of the key hole slit 31. Therefore, the rotary movement of the second the second enclosure 20 is restricted so that only parallel movement is allowed.

Next, the method of rotationally-moving the second enclosure 20 from the first position to the third position will be described.

Figure 8C:
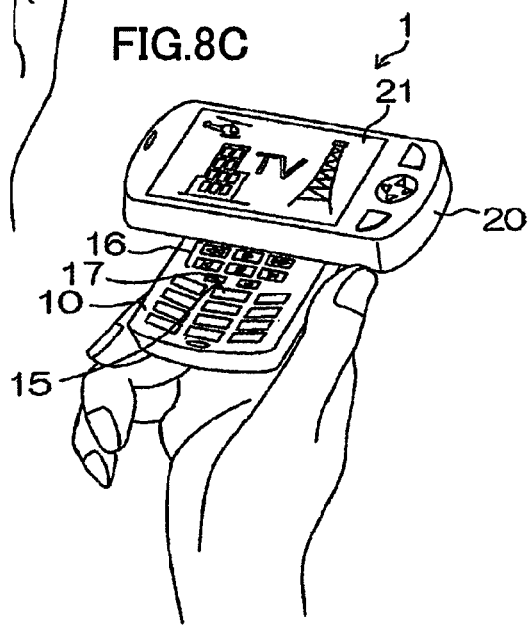

From the states of FIG. 7A and FIG. 8A, as illustrated in FIG. 8C, the first enclosure 10 is retained by a right hand and the second enclosure 20 is displaced on the user's right by the thumb of the right hand. The second enclosure 20 moves counterclockwise and moves to the third position as illustrated in FIG. 7C and FIG. 8C. Meanwhile, the key 33 slides along the inner circumference of the circular hole part of the key hole slit 31.

Here, the counter-clockwise rotation of the second enclosure 20 is restricted by a stopper not illustrated in the drawing to reach 90°. Therefore, the second enclosure 20 is designed not to rotate at 90° and more. In addition, the counter-clockwise rotation of the second enclosure 20 is restricted not to rotate by the stopper not illustrated in the drawing. Therefore, the second enclosure 20 is designed to rotate only in the counter-clockwise direction.

In the state in FIG. 7C and FIG. 8C, that is, in the third position, as illustrated in FIG. 7C, the lock pin 35-2 is fit in the elongated hole part of the key hole slip 31 to lock the second enclosure 20. Therefore, the second e enclosure 20 is halted by a predetermined retaining force in the third position.

Thus, the second enclosure will be allowed to move in parallel from the first position to the second position with just a single touch of a button. In addition, the second enclosure will be allowed to rotate to move from the first position to the third position with just a single touch of a button.

In addition, the portable device 1 automatically detects in which position of the first position, the second position and the third position the first enclosure 10 and the second enclosure 20 are present and switches operation modes of the portable device 1 and restrict usable operation modes based on the detected result.

At first, the method of automatically detecting in which position of the first position, the second position and the third position the first enclosure 10 and the second enclosure 20 are present will be described.

Figure 9:
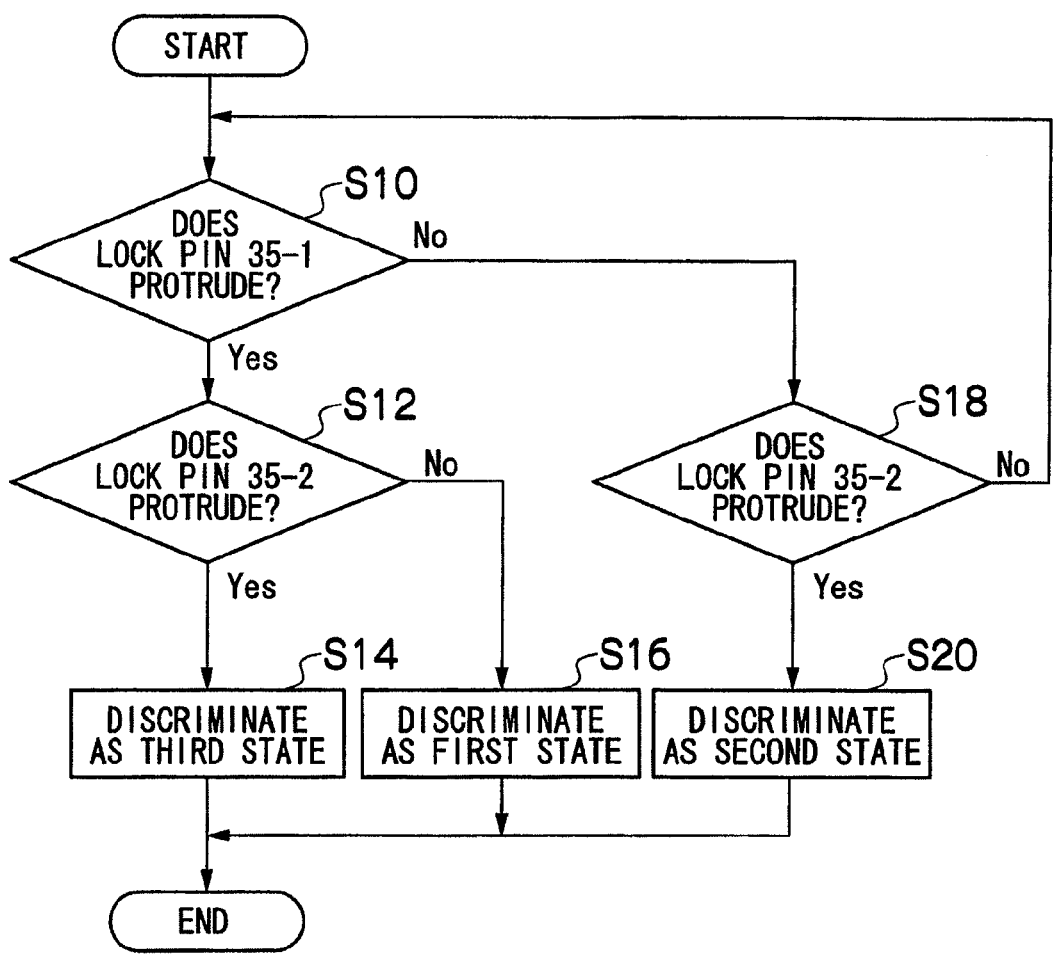
FIG. 9 is a flow chart for illustrating a stream of a process in the case of detecting positional relation between the first enclosure 10 and a second enclosure 20 of the first embodiment of the portable device.

FIG. 9 is a flow chart for illustrating a stream of a process in the case of detecting positional relation between the first enclosure 10 and a second enclosure 20 of the portable device 1.

At first, presence of protrusion of the lock pin 35-1 is discriminated (step S10).

In a step S10, in the case where protrusion of the lock pin 35-1 is discriminated, presence of protrusion of the lock pin 35-2 is discriminated (step S12); in the case where protrusion of the lock pin 35-2 is present, the first enclosure 10 and the second enclosure 20 are discriminated to be in the third position (step S14) and in the case where protrusion of the lock pin 35-2 is not present, the first enclosure 10 and the second enclosure 20 are discriminated to be in the first position (step S16).

In the case where the step S10 discriminates no presence of protrusion of the lock pin 35-1, presence of the lock pin 35-2 is discriminated (step S18), and in the case where protrusion of the lock pin 35-2 is present, the first enclosure 10 and the second enclosure 20 are discriminated to be in the second position (step S20) and in the case where protrusion of the lock pin 35-2 is not present, the first enclosure 10 and the second enclosure 20 are discriminated to be on the way and the process returns to the step 10.

Next, the method of switching operation modes of the portable device 1 and to restrict usable operation modes based on the detected positional relation between the first enclosure 10 and the second enclosure 20 will be described.

In the case were the first enclosure 10 and the second enclosure 20 are in the first position, the portable device is operated in a state limited to a standby mode, a call mode and a camera mode.

As illustrated in FIG. 8A, the portable device 1 is operated in a standby mode which displays a reception state, a battery remaining amount, time and the like on a display. In the case where the phone is ringing in the midst of operation in the standby mode, a second call button 24 is pushed to switch the operation mode, which operates the portable device 1, to a call mode. In the midst of the operation in the call mode, the second call-ending button 25 is pushed so that the operation mode which operates the portable device 1 is switched to the standby mode.

The arrow button 23 is pushed during the operation in the standby mode to switch the operation mode which operates the portable device 1 to the camera mode. In the camera mode, in the case where vertical image pickup is desired, the portable device 1 is positioned vertically as illustrated in FIG. 8A to carry out image pickup, that is, vertical image pickup is preferably carried out. In addition, the case where horizontal image pickup is desired, the portable device 1 is positioned horizontally to carry out image pickup, that is, horizontal image pickup is preferably carried out.

Here, as described above, the operation mode is switched in an order of standby mode and the camera mode with the arrow button 23, which will not limit switching hereto.

In the case where the first enclosure 10 and the second enclosure 20 are in the second position, the portable device is operated in the state of restriction to the call mode, the e-mail mode, the camera mode and the still image reproducing mode.

As illustrated in FIG. 8B, the first enclosure 10 and the second enclosure 20 are moved to the second position and concurrently the portable device 1 is operated in a call mode. In a call mode, a call button 13 is pushed after inputting an arbitrary number with the dial key 12. Thereby, a call to an arbitrary number can be carried out. Here, in the case where the phone rings in the midst of operations in the standby mode in the first position, the first enclosure 10 and the second enclosure 20 are positioned in the second position. Thereby the call mode is automatically selected to start the call. In the case where the call ends, the call-ending button 14 is pushed to end the call.

The mode button 15 is pushed during the operation in the call mode. Thereby the operation mode which operates the portable device 1 is switched to the e-mail mode. In the e-mail mode, characters allocated to the dial keys 12 are input to enable e-mail inputting. When the call button 13 is pushed, e-mail transmission and reception is enabled.

The mode button 15 is pushed during operation in the e-mail mode. The operation mode which operates the portable device 1 is switched to the camera mode. Here, operations in the camera mode are likewise the operations in the first position. Therefore description thereof will be omitted.

By pushing the mode button 15 during the camera mode, the operation mode which operates the portable device 1 is switched to a still image reproducing mode. Frame advance of images is carried out by left and right key operation with the arrow button 23. When the right key of the arrow button 23 is pushed, the next image file is read from the memory 42 and reproduced and displayed on the display 21. In addition, when the left key of the arrow button 23 is pushed, the immediately preceding image file is read from the memory 42 and reproduced and displayed on the display 1.

By pushing the mode button 15 during the operation in a still image reproducing mode, the operation mode which operates the portable device 1 is switched to the call mode again.

Here, as described above, the operation mode is switched in an order of the call mode, the e-mail mode, the camera mode and the still image reproducing mode, which will not limit switching thereto.

In the case where the first enclosure 10 and the second enclosure 20 are present in the third position, the portable device 1 is operated in the state restricted to the television mode, the player mode and the camera mode.

As illustrated in FIG. 8C, at the same time when the first enclosure 10 and the second enclosure 20 are moved to the third position, the portable device 1 is operated in the television mode. In the television mode, a television operation part 16 is used to enable operations such as station selection. In addition, with the audio volume button 17, the audio volume of the television can be changed.

By pushing the mode button 15 during the operation in the television mode, the operation mode which operates the portable device 1 is switched to the player mode. In the player mode, a game, film viewing and the like are allowed. With the television operation part 16, media player operation such as play, stop, fast forwarding and rewinding can be carried out. In addition, with the audio volume button 17, the level of the audio volume can be changed.

By pushing the mode button 15 during the operation in the player mode, the operation mode which operates the portable device 1 is switched to the camera mode. In that case, since the portable device 1 is hardly caused to rotate, display is limited only to the horizontal screen image, that is, horizontal image pickup so that there is no need to change the direction of the portable device 1. Display of the through image is also limited to horizontal images.

By pushing the mode button 15 during operations in a camera mode, the operation mode which operates the portable device 1 is switched to the television mode again.

Here, as described above, the operation mode is switched in an order of the television mode, the player mode and the camera mode, which will not limit switching thereof.

Here, in the operation mode which is operable in a plurality of positions, while the state where portable device 1 is operated in that operation mode is kept, the positional relation between the first enclosure 10 and the second enclosure 20 can be changed. In the present embodiment, the camera mode corresponds thereto. For example while the state of activating the portable device 1 in the camera mode is kept, the second position can be moved to the third position.

Thus, it is automatically detected in which position of the first position, the second position and the third position the first enclosure 10 and the second enclosure 20 are present. Based on the detected result, switching of the operation mode of the portable device 1 and the usable operation mode is limited.

According to the present embodiment, the second enclosure can be easily moved with one hand to the second position with the display device being vertically directed from the first position being the storage state and to the third position with the display device being horizontally directed from the first position being the storage state.

In addition, in the first position, horizontal movements and rotary movements of the second enclosure are allowed; in the second position, only horizontal movements of the second enclosure are allowed; and in the third position, only rotary movements of the second enclosure are allowed, the movements of the second enclosure is restrained so that no unnecessary movement is feasible. Therefore, the second enclosure can be moved easily with one hand.

In addition, with the halting part being a portion where the first enclosure and the second enclosure are overlapped in the first position and being arranged between the first enclosure and the second enclosure, the second enclosure is halted with a predetermined retaining force in the first position, the second position and the third position. Therefore, in the case of moving the second enclosure to a predetermined position, the operation of moving the second enclosure will become easy.

In addition, based on the positional relation between the first enclosure and the second enclosure, only the required operation parts are exposed in the respective positions. Therefore, operability can be made good.

In addition, based on the positional relation between the detected first enclosure and second enclosure, one of switching of operation mode of the portable device and limitation on the usable operation mode is carried out. Thereby the second enclosure is operated easily with one hand and the operation mode is switched. Therefore, operability can be made good.

In addition, since the camera is always exposed, snapshot performance can be made good.

In addition, in the case where the subject image acquired through the image pickup lens, that is, the through image is output to the display device at the time of image pickup, the direction of the subject image to be output is changed based on the positional relation between the first enclosure and the second enclosure. Therefore, there is no need to change the direction of the portable device and operability of portable device can be made good.

Here, in the present embodiment, in the first position, by pushing the call button only in the case where a call rings in the standby mode, the portable device 1 was operated in the call mode. However, without being limited thereto, the portable device can be made operable also in a outgoing call mode to a registered number which can make a phone call only to registered numbers registered in the portable device in advance. In the outgoing call mode to a registered number, the outgoing destination is selected by the left and right buttons of the arrow button 23 to make a call with the call button 24. Then operations will become feasible only with the second operation part 41*b* exposed in the first position.

Second Embodiment

In the portable device of the above described first embodiment, an image pickup part of a camera is arranged in the first enclosure. However, without being limited thereto, the image pickup part can be arranged in the second enclosure. Similar to the first embodiment, parts of the camera except for the image pickup part may be arranged in either of the first enclosure and the second enclosure.

The portable device of the present embodiment includes an image pickup part of a camera being arranged in the second enclosure so that the image pickup lens is exposed only in the case where the first enclosure and the second enclosure are present in the second position. FIGS. 10A, 10B and 10C are diagrams for illustrating an appearance of a portable device 1*a* of the present embodiment, FIG. 10A illustrating a first position (a storage state) where silhouettes of a first enclosure and a second enclosure are overlapped; FIG. 10B illustrating a use stage at a second position with a display device being directed horizontally and FIG. 10C illustrating a third position with the display device being directed horizontally. Here, like reference characters designate the same or similar parts as in the first embodiment throughout the figures thereof.

An image pickup part 2*a* of a camera is arranged on the plane opposite to the display 21 of the second enclosure 20.

The image pickup part 2*a* is covered by the first enclosure 10 in the first position (see FIG. 10A); is exposed so as to enable image pickup of a subject in the second position (see FIG. 10B); and is covered by the enclosure 10 in the third position (see FIG. 10C).

The portable device 1*a* automatically detects in which position of the first position, the second position and the third position the first enclosure 10 and the second enclosure 20 are present and, as described below, switches operation modes of the portable device 1*a* and restrict usable operation modes based on the detected result.

In the case where the first enclosure 10 and the second enclosure 20 are present in the first position, the portable device is operated in the state of being limited to the standby mode and the call mode.

In the case where the first enclosure 10 and the second enclosure 20 are in the second position, the portable device is operated in the state of restriction to the call mode, the e-mail mode, the camera mode and the still image reproducing mode. The four operation mode is switched in an order of the call mode, the e-mail mode, the camera mode and the still image reproducing mode by pushing the mode button 15.

In the camera mode, in the case of a process of vertical image (vertical image pickup), the image pickup is carried out inn a posture illustrated in FIG. 10B and image pickup is carried out b rotating the portable device 1*a* in its entirety by 90° in the case of carrying out a process on the horizontal image (horizontal image pickup).

In the case where the first enclosure 10 and the second enclosure 20 are present in the third position, the portable device is operated in a state of being limited to the television mode and the player mode. By pushing the ode button 15, two operation modes of the television mode and the player mode are switched in order.

According to the mode of the present invention, in the case where the second enclosure 2 is present in the second position, the image pickup lens is exposed, and therefore the subject can undergo image pickup. However, in the case where the second enclosure is present in the third position, the image pickup lens is covered to protect the image pickup lens. Therefore, at the time of storage, in the case where no camera is used in such a case where the portable device is being operated in the television mode, the image pickup lens can be protected by covering the image pickup lens with the first enclosure.

In addition, among all the operation modes including the camera mode and the television mode of the portable device, the camera mode is made operable with the second enclosure being present in the second position and the television mode is made operable with the second enclosure being present in the third position so that the portable device 1 is controlled to the required operation modes in the required position. Therefore, operability of the portable device can be made good.

Third Embodiment

In the portable device of the above described second embodiment, an image pickup part of a camera is arranged in the second enclosure so that the image pickup lens is exposed only in the case where the first enclosure and the second enclosure are present in the second position, which will not be limited hereto. Also in the case here the first enclosure and the second enclosure are present in the third position, the image pickup lens can be exposed. Similar to the first and second embodiment, parts of the camera except for the image pickup part may be arranged in either of the first enclosure and the second enclosure.

The portable device of the present embodiment includes an image pickup part of a camera being arranged in the second enclosure so that the image pickup lens is exposed in the case where the first enclosure and the second enclosure are present in the second position and the third position. FIGS. 11A, 10B and 11C are diagrams for illustrating an appearance of a portable device 1b of the present embodiment, FIG. 11A illustrating a first position (a storage state) where silhouettes of a first enclosure and a second enclosure are overlapped; FIG. 11B illustrating a use stage at a second position with a display device being directed vertically and FIG. 11C illustrating a third position with the display device being directed horizontally. Here, like reference characters designate the same or similar parts as in the first embodiment throughout the figures thereof.

An image pickup part 2b of a camera is arranged on the plane opposite to the display 21 of the second enclosure 20.

The image pickup part 2b is covered by the first enclosure 10 in the first position (see FIG. 11A); is exposed so as to enable image pickup of a subject in the second position and the third position (see FIGS. 11B and 11C).

The portable device 1b automatically detects in which position of the first position, the second position and the third position the first enclosure 10 and the second enclosure 20 are present and, as described below, switches operation modes of the portable device 1a and restrict usable operation modes based on the detected result.

In the case where the first enclosure 10 and the second enclosure 20 are present in the first position, the portable device is operated in the state of being limited to the standby mode, the call mode and the still image reproducing mode (to be described below in detail). By pushing the arrow button 23, two operation modes of the standby mode and the still image reproducing mode are switched in order.

In the case where the first enclosure 10 and the second enclosure 20 are in the second position, the portable device is operated in the state of restriction to the call mode, the e-mail mode, the camera mode (to be described below in detail) and the still image reproducing mode (to be described below in detail). The four operation mode is switched in an order of the call mode, the e-mail mode, the camera mode and the still image reproducing mode by pushing the mode button 15.

In the case where the first enclosure 10 and the second enclosure 20 are present in the third position, the portable device is operated in a state of being limited to the television mode, the player mode, the camera mode (to be described below in detail) and the still image reproducing mode (to be described below in detail). By pushing the mode button 15, four operation modes of the television mode, the player mode, the camera mode and the still image reproducing mode are switched in order.

Next, operations in the camera mode will be described.

The camera mode is limited to be operated only in the second position and the third position as described above. While being kept to operate in the camera mode, the portable device 1b can be moved from the second position to the third position and from the third position to the second position.

Figure 12A:
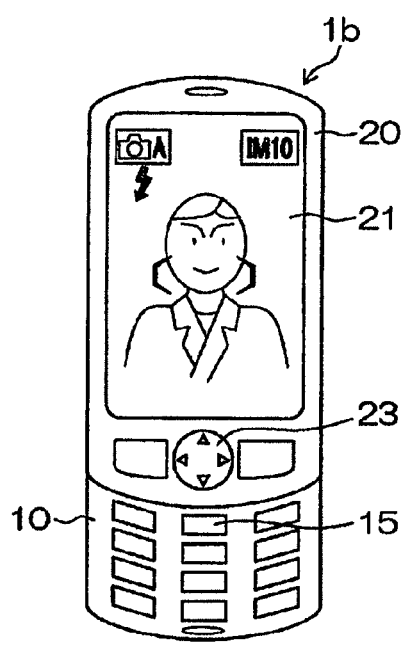
FIGS. 12A and 12B are diagrams for illustrating an appearance of a third embodiment of the portable device, FIG. 12A being a diagram for illustrating a use stage at a second position with a display device being directed vertically and FIG. 12B being a diagram for illustrating a third position with the display device being directed horizontally.

In the second position, as illustrated in FIG. 12A, the portable device will enter a vertical image pickup mode that carries out image pickup of vertical images and the vertical subject image and the image pickup information (electronic flash mode, image pickup mode, pixel number, remaining image pickup number and the like) are displayed on the display 21.

Figure 12B:
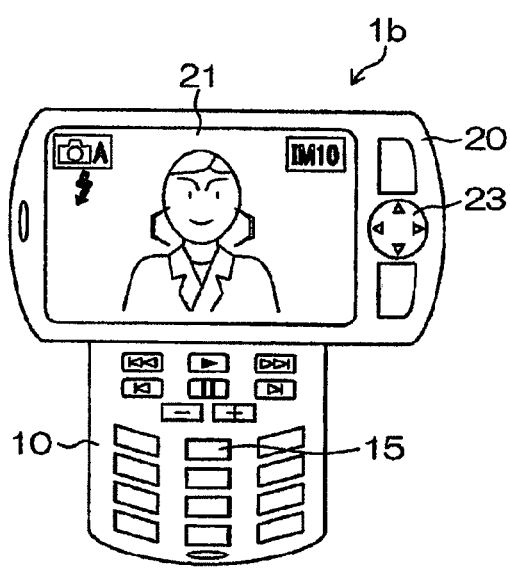

In the third position, as illustrated in FIG. 12B, the portable device will enter a horizontal image pickup mode that carries out image pickup of horizontal images and the horizontal subject image and the image pickup information (electronic flash mode, image pickup mode, pixel number, remaining image pickup number and the like) are displayed on the display 21.

The subject image displayed on the display 21 is stored in the memory 42 by pushing one of the arrow button 23 and the mode button 15. Image pickup posture information designating the image due to one of vertical image pickup and horizontal image pickup and the image pickup information is attached to the stored image. In the still image reproducing mode, the information attached to the image can be read together with that image.

Next, the still image reproducing mode will be described.

The still image reproducing mode is an operation mode which is operable in a plurality of positions. Therefore, while keeping the portable device 1b in the state of operating in the still image reproducing mode, the positional relation between the first enclosure 10 and the second enclosure 20 can be changed.

Figure 13:
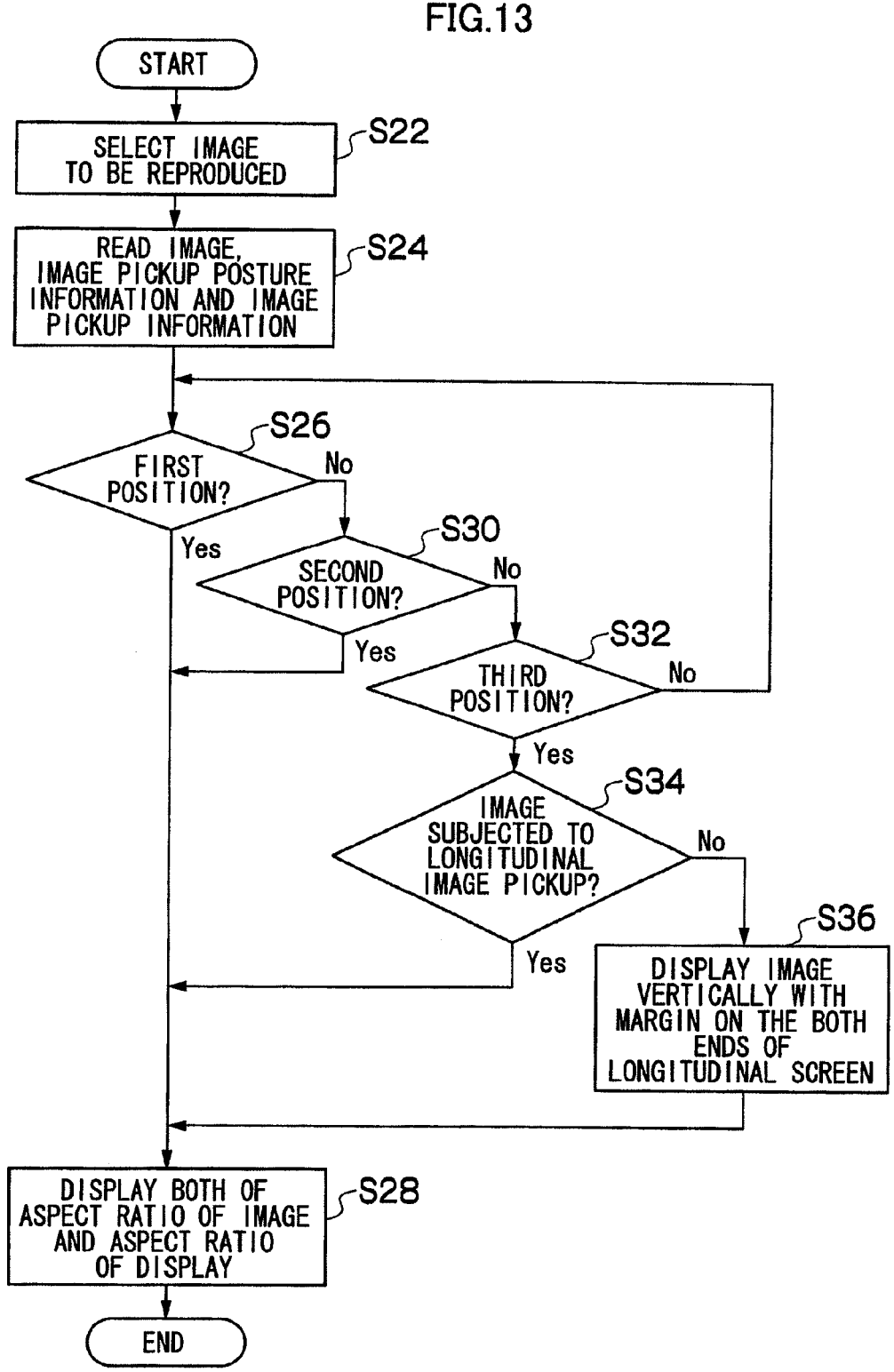
FIG. 13 is a flow chart for illustrating a stream of a process in a still image display mode of the third embodiment of the portable device.

FIG. 13 is a flow chart for illustrating a stream of a process for changing the direction of the image display based on the detected positional relation between the first enclosure 10 and the second enclosure 20.

When an image to be reproduced is selected (step S22), the selected image and the attached image posture information and image pickup information are read out of the memory 42 (step S24). Here, in the case where no image to be reproduced is selected by an operator in the case where the reproducing mode is selected, a predetermined image such as the last captured image and the last reproduced image is selected according to a rule determined in advance.

Presence of the first enclosure 10 and the second enclosure 20 in the first position is determined (step S26).

In the case where the first enclosure 10 and the second enclosure 20 are determined to be present in the first position, as illustrated in FIGS. 14A and 14B, regardless of the image posture information, both of the aspect ratio of the image and the aspect ratio of the display 21 are displayed (step S28). In the case of presence in the first position, without changing the hand to hold the portable device 1b, the portable device 1b can be easily directed horizontally. Accordingly, also in the case of a horizontal image, as illustrated in FIG. 14B, viewing the portable device 1b horizontally, an erected image can be viewed easily.

In the case where the first enclosure 10 and the second enclosure 20 are determined not to be present in the first position, presence of the first enclosure 10 and the second enclosure 20 in the second position is determined (step S30).

In the case where the first enclosure 10 and the second enclosure 20 are determined to be present in the second position, as illustrated in FIGS. 15A and 15B, regardless of the image posture information, both of the aspect ratio of the image and the aspect ratio of the display 21 are displayed (step S28). In the case of presence in the first position, without changing the hand to hold the portable device 1b, the portable device 1b can be easily directed horizontally. Accordingly, also in the case of a horizontal image, as illustrated in FIG. 15B, viewing the portable device 1b horizontally, an erected image can be viewed easily.

In the case where the first enclosure 10 and the second enclosure 20 are determined not to be present in the second position, presence of the first enclosure 10 and the second enclosure 20 in the third position is determined (step S32).

In the case where the first enclosure 10 and the second enclosure 20 are determined not to be present in the third position, the first enclosure 10 and the second enclosure 20 are determined to be on their ways and the flow returns to the step S26 so that presence of the first enclosure 10 and the second enclosure 20 in the first position is determined again.

In the case where the first enclosure 10 and the second enclosure 20 are determined to be present in the third position, based on the image posture information attached to the image, it is determined whether that image is an image subjected to horizontal image pickup (step S34).

In the case where that image is determined to be the image subjected to horizontal image pickup, as illustrated in FIG. 16B, regardless of the image posture information, both of the aspect ratio of the image and the aspect ratio of the display 21 are displayed (step S28).

In the case here that the image is determined not to be the image subjected to horizontal image pickup, as illustrated in FIG. 16A, blank portions with predetermined width are prepared in the left and the right parts of the display 21 so that a vertical image is displayed in an erected state in the center part of the display 21 (step S36).

In the third position, the portable device 1b is hardly directed horizontally due to its shape and thus the erected image is viewable more easily.

Thereby, in the first position, the second position and the third position, the erected image is viewable more easily.

According to the present embodiment, in the case where the second enclosure is present in the first position, the image pickup lens is covered by the first enclosure to protect the image pickup lens. However, in the case where the second enclosure is present in the second position and the third position, the image pickup lens is exposed to allow image pickup on a subject. Therefore, by moving the second enclosure between the second position for carrying out vertical image pickup and the third position for carrying out the horizontal image pickup, the vertical image pickup and the horizontal image pickup can be easily switched by one hand.

In addition, since the second position for carrying out the vertical image pickup and the third position for carrying out the horizontal image pickup can be switched easily, the vertical image pickup and the horizontal image pickup become feasible without rotating the appliance while the appliance is being held.

In addition, the image pickup posture information, that designates the image to be subjected to one of vertical image pickup and horizontal image pickup, is attached to the image subjected to the vertical image pickup in the second position and subjected to the horizontal image pickup in the third position. Therefore, by using that information at the time of reproducing, visibility can be enhanced.

In addition, based on the positional relation between the first enclosure and the second enclosure and the image pickup posture information that designates whether the image subjected image pickup attached to the image to be reproduced is the image subjected to one of the vertical image pickup and horizontal image pickup, the display device is caused to display an image so that the image erects on the display of the display device. Thereby the direction of the image subjected to image pickup and direction of the image displayed according to the direction of the display device are automatically changed. Therefore, operability of the portable device can be made good.

Here, in the present embodiment, the direction for displaying an image is changed based on image posture information attached to the image. However, also in the case of lacking in the image posture information, image recognition is carried out at the time of reproduction so that determination on one of the vertical image and the horizontal image at that place. Thereby the direction for displaying an image can be changed.

In addition, in the present embodiment, in the first position and the second position, both of the aspect ratio of the image and the aspect ratio of the display 21 are displayed. However, in the case of the second position, the direction of the portable device is hardly changeable than in the case of the first position. Therefore, also in the second position, the image can be caused to rotate to display the image so that the image is always displayed in an erected manner based on the image posture information. Here, the case of displaying a horizontal image, a predetermined blank portions can be prepared at the top and the bottom portions of the display to display the horizontal image in the center part of the display.

What is claimed is:

1. A portable device comprising:
    a first enclosure;
    a second enclosure to which a display device for displaying at least one of characters and images is arranged;
    a joint mechanism which joints the first enclosure and the second enclosure together;
    an operation device configured by a plurality of operation parts which inputs a command to the portable device;
    a detection device which detects positional relation between the first enclosure and the second enclosure; and
    a control device which carries out switching of operation modes of the portable device and restriction of usable operation modes, based on the positional relation between the first enclosure and the second enclosure detected by the detection device, wherein the joint mechanism brings the first enclosure and the second enclosure into movable linkage between a first position where silhouettes of the first enclosure and the second enclosure are overlapped and a second position where the second enclosure is moved in parallel from the first position in a plane of the first enclosure, and movable linkage directly between the first position and a third position, without passing through the second position, where the second enclosure is rotatably moved at a predetermined angle from the first position in the plane of the first enclosure, wherein the operation device is arranged in the first enclosure so that mutually different operation parts among the plurality of operation parts are exposed in the second position and the third position to become operable, and wherein the detection device detects which of the first position, the second position, and the third position the positional relation between the first and the second enclosure is selected.

2. The portable device according to claim 1, comprising a restriction device which restricts movement of the second enclosure, wherein the restriction device restricts movement of the second enclosure so as to enable movement in parallel and rotary movement of the second enclosure in the first position, enable only movement in parallel of the second enclosure in the second position, and enable only rotary movement of the second enclosure in the third position.

3. The portable device according to claim 1, comprising a halt mechanism which halts the second enclosure at the first position, the second position and the third position respectively at predetermined forces;

wherein the halt mechanism is arranged at a portion where the first enclosure and the second enclosure are overlapped in the first position, the portion between the first enclosure and the second enclosure.

4. The portable device according to claim 2, comprising a halt mechanism which halts the second enclosure at the first position, the second position and the third position respectively at predetermined forces;

wherein the halt mechanism is arranged at a portion where the first enclosure and the second enclosure are overlapped in the first position, the portion between the first enclosure and the second enclosure.

5. The portable device according to claim 1, wherein an image pickup part of a camera for picking up images of a subject is arranged on a plane opposite to the plane where the first enclosure is jointed to the second enclosure.

6. The portable device according to claim 1, wherein an image pickup part of a camera is arranged in the second enclosure opposite to the display device so that an image pickup lens is exposed so as to allow image pickup on a subject in the case where the second enclosure is present in the second position and the image pickup lens is covered by the first enclosure in the case where the second enclosure is present in the third position.

7. The portable device according to claim 6, wherein, among all the operation modes including the camera mode and television mode of the portable device, the control device makes the camera mode operable in the second position and makes the television mode operable in the third position.

8. The portable device according to claim 1, wherein an image pickup part of a camera is arranged in the second enclosure opposite to the display device so that the image pickup device is covered by the first enclosure in the case where the second enclosure is present in the first position and the image pickup lens is exposed so as to enable image pickup of a subject in the case where the second enclosure is present in the second position and the third position.

9. A portable device comprising:

a first enclosure;

a second enclosure to which a display device for displaying at least one of characters and images is arranged;

a joint mechanism which joints the first enclosure and the second enclosure together;

an operation device configured by a plurality of operation parts which inputs a command to the portable device, wherein the joint mechanism brings the first enclosure and the second enclosure into movable linkage between a first position and a second position, and movable linkage directly between the first position and a third position, without passing through the second position, which is different from the second position, wherein the operation device is arranged in the first enclosure so that mutually different operation parts among the plurality of operation parts are exposed in the second position and the third position to become operable, wherein the joint mechanism comprises:

a connecting member which connects the first enclosure and the second enclosure;

a first lock pin which is arranged in the first enclosure with a distance to the connecting member in a sliding direction of the first and the second enclosures and which is urged toward the second enclosure; and a second lock pin which is arranged in the second enclosure with a distance to the connecting member in a direction perpendicular to the sliding direction and which is urged toward the second enclosure, wherein a detection device comprises:

a first detection switch which detects whether the first lock pin is protruded from the first enclosure; and a second detection switch which detects whether the second lock pin is protruded from the first enclosure, and wherein the detection device detects that the relation between the first enclosure and the second enclosure is in the first position when the first and the second detection switches detect that the first lock pin is protruded and the second lock pin is not protruded, detects that the relation between the first enclosure and the second enclosure is in the second position when the first and the second detection switches detect that the first lock pin is not protruded and the second lock pin is protruded, and detects that the relation between the first enclosure and the second enclosure is in the third position when the first and the second detection switches detect that the first and the second lock pins are protruded.

* * * * *